US012355037B2

(12) United States Patent
Sodeyama

(10) Patent No.: US 12,355,037 B2
(45) Date of Patent: Jul. 8, 2025

(54) SECONDARY BATTERY

(71) Applicant: MURATA MANUFACTURING CO., LTD., Kyoto (JP)

(72) Inventor: Kunio Sodeyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 899 days.

(21) Appl. No.: 16/561,830

(22) Filed: Sep. 5, 2019

(65) Prior Publication Data

US 2020/0036045 A1  Jan. 30, 2020

Related U.S. Application Data

(63) Continuation of application No. PCT/JP2017/037337, filed on Oct. 16, 2017.

(30) Foreign Application Priority Data

Mar. 6, 2017  (JP) ................................ 2017-041916

(51) Int. Cl.
*H01M 10/0587*     (2010.01)
*H01M 4/80*        (2006.01)
(Continued)

(52) U.S. Cl.
CPC ....... *H01M 10/0587* (2013.01); *H01M 4/806* (2013.01); *H01M 10/0525* (2013.01);
(Continued)

(58) Field of Classification Search
CPC ............ H01M 50/107; H01M 50/531; H01M 50/574; H01M 50/572; H01M 50/463;
(Continued)

(56) References Cited

U.S. PATENT DOCUMENTS

2007/0020515 A1   1/2007  Lee et al.
2010/0055555 A1   3/2010  Fukase et al.
(Continued)

FOREIGN PATENT DOCUMENTS

CN   102983356   3/2013
CN   107004854   8/2017
(Continued)

OTHER PUBLICATIONS

Chinese Office Action issued Dec. 29, 2021 in corresponding Chinese Application No. 201780087345.7.
(Continued)

*Primary Examiner* — Kiran Quraishi Akhtar
(74) *Attorney, Agent, or Firm* — K&L Gates LLP

(57) ABSTRACT

A secondary battery having excellent battery characteristics and excellent reliability is provided. The secondary battery includes an electrode, an electrolytic solution, a can configured to accommodate the electrode and the electrolytic solution, and an insulator disposed between the electrode and the can, wherein a can bottom of the can has at least one recess, the insulator has at least one hole, and at least a part of the at least one recess and at least a part of the at least one hole have no overlap with each other.

13 Claims, 25 Drawing Sheets

(51) Int. Cl.
*H01M 10/0525* (2010.01)
*H01M 50/107* (2021.01)
*H01M 50/202* (2021.01)
*H01M 50/296* (2021.01)
*H01M 50/454* (2021.01)
*H01M 50/531* (2021.01)
*H01M 50/609* (2021.01)

(52) U.S. Cl.
CPC ....... *H01M 50/107* (2021.01); *H01M 50/202* (2021.01); *H01M 50/454* (2021.01); *H01M 50/609* (2021.01); *H01M 50/296* (2021.01); *H01M 50/531* (2021.01)

(58) Field of Classification Search
CPC ............. H01M 4/806; H01M 10/0525; H01M 10/0587; H01M 10/05; H01M 2220/20; H01M 2220/30; H01M 50/202; H01M 50/454; H01M 50/609; H01M 50/296; H01M 50/342; H01M 50/3425; H01M 50/394; H01M 50/56; H01M 50/578; H01M 10/052; H01M 10/0422; Y02T 90/167; Y04S 30/12; H02J 2300/20; H02J 2310/14; H02J 7/0063; H02J 3/32; H02J 3/381; H02J 7/35; H02J 2310/48; B60L 50/64
USPC ......................................................... 429/322
See application file for complete search history.

(56) References Cited

U.S. PATENT DOCUMENTS

| | | | |
|---|---|---|---|
| 2014/0045000 | A1 | 2/2014 | Kim |
| 2017/0309891 | A1* | 10/2017 | Matsui .................... C01F 7/043 |
| 2017/0317326 | A1* | 11/2017 | Fujikawa ............ H01M 50/169 |
| 2018/0175333 | A1 | 6/2018 | Sodeyama et al. |

FOREIGN PATENT DOCUMENTS

| | | | |
|---|---|---|---|
| CN | 107112472 | | 8/2017 |
| JP | 2003157821 | A | 5/2003 |
| JP | 2007027109 | A | 2/2007 |
| JP | 2010061815 | A | 3/2010 |
| JP | 2016105366 | A | 6/2016 |
| KR | 1020160015898 | | 2/2016 |
| WO | 2011155198 | A1 | 12/2011 |
| WO | 2016067510 | A1 | 5/2016 |
| WO | WO-2016088471 | A1 * | 6/2016 ............. C01F 7/043 |
| WO | 2016203708 | A1 | 12/2016 |

OTHER PUBLICATIONS

International Search Report for Application No. PCT/JP2017/037337, dated Dec. 12, 2017.
European Search Report issued Nov. 12, 2020 in corresponding European Application No. 17899347.3.
European Office Action issued Jan. 16, 2023 in corresponding European Application No. 17899347.3.

* cited by examiner

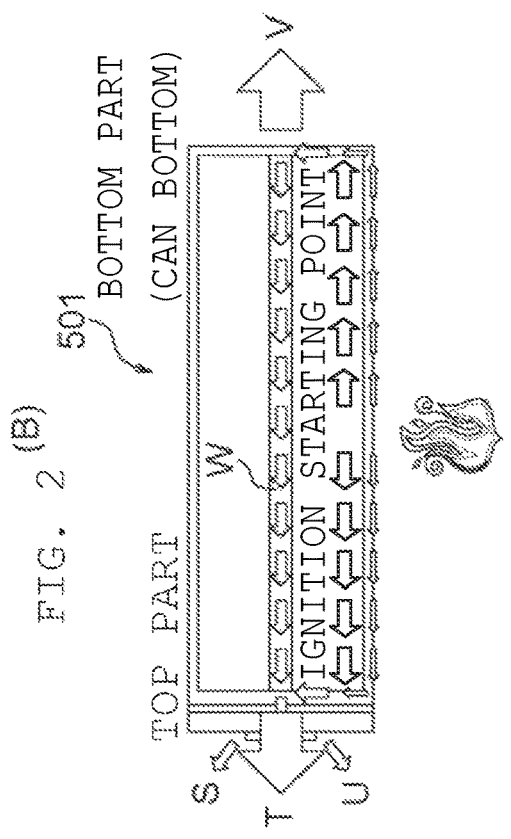
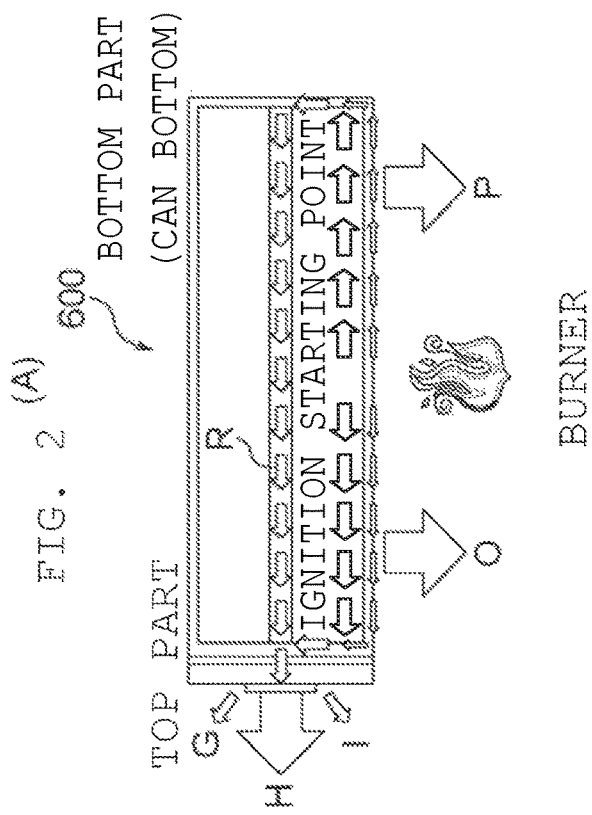
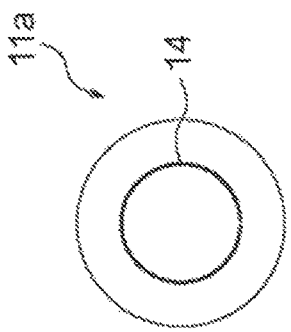

FIG. 11

| | EXAMPLE 1 | EXAMPLE 4 | EXAMPLE 5 | EXAMPLE 6 |
|---|---|---|---|---|
| OVERLAP RATIO BETWEEN HOLE AND RECESS OF CAN BOTTOM | 0% | 49.0% (9 DEGREES × 5 PIECES + 21 DEGREES × 6 PIECES)/ 349 DEGREES | 31.8% (9 DEGREES × 5 PIECES + 11 DEGREES × 6 PIECES)/ 349 DEGREES | 12.9% (9 DEGREES × 5 PIECES)/349 DEGREES |
| LIQUID LEAKAGE START PERIOD | 3 YEARS | 0.4 YEARS | 1 YEAR | 2 YEARS |

SECONDARY BATTERY

CROSS REFERENCE TO RELATED APPLICATIONS

The present application is a continuation of PCT patent application no. PCT/JP2017/037337, filed on Oct. 16, 2017, which claims priority to Japanese patent application no. JP2017-041916 filed on Mar. 6, 2017, the entire contents of which are being incorporated herein by reference.

BACKGROUND

The present technology generally relates to a secondary battery, and more particularly to a secondary battery, a battery pack, a vehicle, an electric storage system, an electric power tool, and an electronic device.

In recent years, demand for batteries, in particular, secondary batteries has been rapidly expanding in technical fields such as electronic devices such as personal computers (PCs) and mobile communication terminals, cars such as electric cars, and new energy systems such as wind power generation.

SUMMARY

In the conventional technology, there is a possibility that the secondary batteries may be incapable of making further improvements in battery characteristics and reliability. Therefore, secondary batteries with improved battery characteristics and reliability are desired now.

The present technology generally relates to a secondary battery, and more particularly to a secondary battery, a battery pack, a vehicle, an electric storage system, an electric power tool, and an electronic device.

The present technology has been achieved in view of the foregoing circumstances, and a main object of the technology is to provide a secondary battery which has excellent battery characteristics and excellent reliability, and a battery pack, a vehicle, an electric storage system, a power tool, and an electronic device including the secondary battery.

According to an embodiment of the present technology, a secondary battery which has excellent battery characteristics and excellent reliability is provided.

More specifically, The secondary battery includes an electrode, an electrolytic solution, a can configured to accommodate the electrode and the electrolytic solution, and an insulator disposed between the electrode and the can; wherein the can bottom of the can has at least one recess, the insulator has at least one hole, and at least a part of the at least one recess and at least a part of the at least one hole have no overlap with each other.

According to an embodiment of the present technology, in the secondary battery, the at least one recess and the at least one hole may have no overlap with each other.

According to an embodiment of the present technology, in the secondary battery; the overlap ratio between the at least one recess and the at least one hole may be 13% or less.

According to an embodiment of the present technology, in the secondary battery, an opening ratio of the at least one hole may be 5% or more and 40% or less.

According to an embodiment of the present technology, in e secondary battery, the battery capacity of the secondary battery may be 2.5 Ah or more.

According to an embodiment of the present technology, in the secondary battery, the insulator may include an insulating plate and a filter member.

According to an embodiment of the present technology, in the secondary battery, the filter member may be a nonwoven fabric.

According to an embodiment of the present technology, in the secondary battery, the insulator may include an insulating plate.

According to an embodiment of the present technology, the secondary battery may have a cylindrical shape.

Furthermore, the present technology provides:

- a battery pack including the secondary battery as described herein, a controller configured to control the usage state of the secondary battery, and a switch configured to switch the usage state of the secondary battery in accordance with an instruction from the control unit;
- a vehicle including the secondary battery as described herein, a driving force converter configured to receive power supply from the secondary battery to convert the power to a driving force for the vehicle, a driver configured to work in accordance with the driving force, and a vehicle controller;
- an electric storage system including an electric storage device including the secondary battery as described herein, a power consumption device configured to be supplied with electric power from the secondary battery, a controller configured to control power supply to the power consumption device from the secondary battery, and a power generator configured to charge the secondary battery;
- a power tool including the secondary battery as described, and a movable part configured to be supplied with electric power from the secondary battery; and
- an electronic device including the secondary battery as described herein, wherein the electronic device is configured to receive power supply from the secondary battery.

According to the present technology, battery characteristics and reliability can be improved. It should be understood that the effects described herein are not necessarily to be considered limited, and other suitable properties relating to the present technology may be realized and as further described.

BRIEF DESCRIPTION OF FIGURES

FIGS. 2(A), 2(B), 2(C) and 2(D) are diagrams for illustrating the function of a recess in a can bottom provided in the secondary battery according to an embodiment of the present technology.

FIG. 11 is a diagram illustrating configuration examples of insulators provided in secondary batteries according to embodiments of the present technology, and the results of the overlap ratio between holes and a recess of a can bottom, and of the liquid leakage start period from overdischarge.

DETAILED DESCRIPTION

Figure 1B:
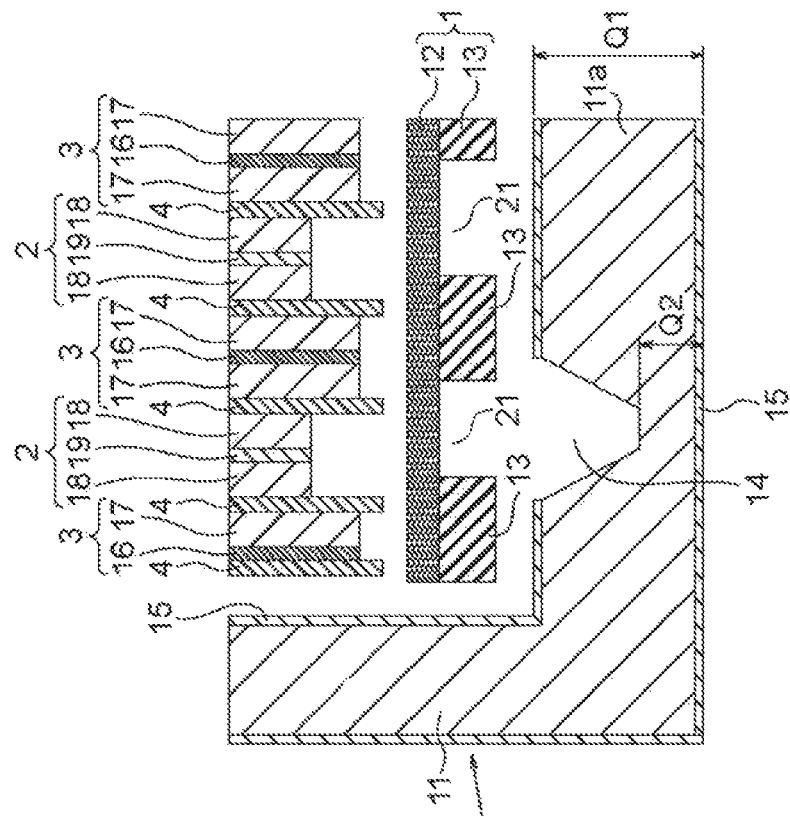
FIGS. 1(A) and 1(B) are diagrams illustrating a configuration example of a secondary battery according to an embodiment of the present technology and an insulator provided in the secondary battery.

The present technology generally relates to a secondary battery, and more particularly to a secondary battery, a battery pack, a vehicle, an electric storage system, an electric power tool, and an electronic device.

As described herein, the present disclosure will be described based on examples with reference to the drawings, but the present disclosure is not to be considered limited to the examples, and various numerical values and materials in the examples are considered by way of example.

First, the outline of the present technology described.

The secondary battery according to the present technology includes a can that houses electrodes and an electrolytic solution, and an insulator that is disposed between the electrodes and the can. The bottom of the can is provided with at least one recess that has a gas release mechanism for releasing gas, and the insulator is provided with at least one hole. The secondary battery according to the present technology has a structure in which at least a part of at least one recess and at least a part of at least one hole have overlap with each other. Having the structure in which at least a part of the at least one recess and at least a part of the at least one hole have no overlap with each other can prevent dissolution of the can in the overdischarge area.

In the secondary battery according to the present technology, the overlap ratio between the at least one recess and the at least one hole may be any overlap ratio, but is preferably 13% or less. This preferred overlap ratio can further prevent dissolution of the can in the overdischarge area.

The opening ratio of the at least one hole of the insulator (total area of holes/virtual circle area) may be any opening ratio, but is preferably 5% to 40%. This opening ratio can prevent a voltage drop due to the ingress of metal contamination, and prevent the drop insulation from being decreased due to decreased component strength. In addition, the opening ratio of 5 to 40%, can further prevent a voltage drop due to the ingress of metal contamination, and further prevent the drop insulation from being decreased due to decreased component strength, and then achieve a balance between the prevention of a voltage drop due to the ingress of metal contamination and the prevention of the drop insulation decrease due to decreased component strength. Although there is a technique (Patent Document 1) related to an insulating plate that has a mesh structure with an opening ratio in the range of 5 to 80%, the technique fails to specifically clarify the shape, configuration, and the like of the insulating plate.

In applying the present technology, the secondary battery may have any battery capacity, but in some cases, the battery capacity of the secondary battery is preferably 2.5 Ah or more from the viewpoints of durability against the contamination (for example, metal contamination and collection functionality.

The present technology is based on the foregoing circumstances, and according to the present technology, the battery characteristics and reliability of the secondary battery can be improved and maintained. The secondary battery according to the present technology is, for example, a cylindrical lithium ion secondary battery, which is applied to a battery pack, a vehicle, an electric storage system, a power tool, an electronic device, and the like.

A secondary battery according to a first embodiment (secondary battery example 1) of the present technology will be described with reference to FIGS. 1 to 7.

Figure 1A:
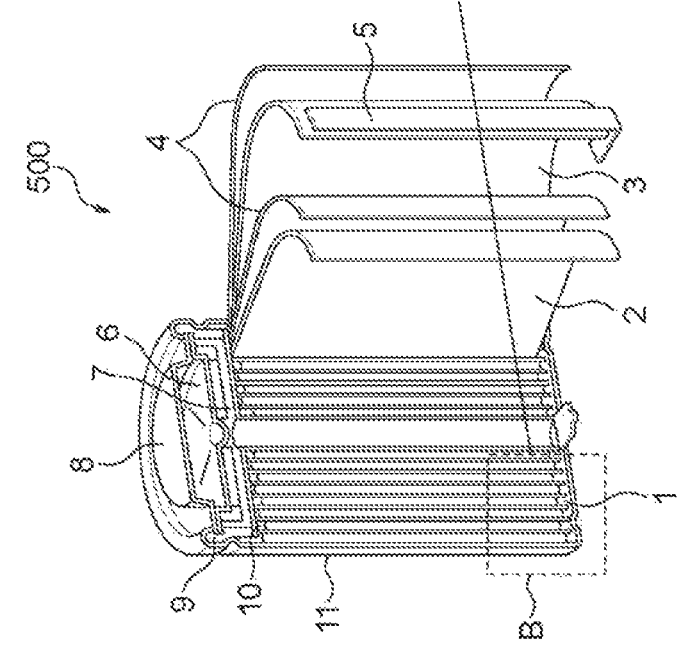

FIG. 1(A) is an exploded perspective view of a partially broken cylindrical non-aqueous secondary battery 500. FIG. 1(B) is an enlarged cross-sectional view of the enlarged part B shown in FIG. 1(A).

As shown in FIGS. 1(A) and 1(B), in the cylindrical non-aqueous secondary battery 500, an insulator 1 of a non-woven fabric 12 and an insulating plate 13 combined and laminated is disposed between a first electrode 2 (a positive electrode 2 in FIG. 1) and a second electrode 3 (a negative electrode 3 in FIG. 1) in a lower part of the cylindrical non-aqueous secondary battery 500 (in a downward direction in FIG. 1(A)), and a can bottom 11a of a can 11 (a negative electrode can 11 in FIG. 1). As shown in FIG. 1(B), at least a part of a hole 21 of the insulator 1 has no overlap with at least a part of a recess 14. More specifically, the hole 21 is not completely overlapped with the recess 14, and the position of the hole 21 is not completely coincident with the position of the recess 14 in the horizontal direction in FIG. 1(B). The recess 14 and the insulator 1 can, as a function (role) thereof, collect metal contamination with the non-woven fabric 12 in the injection of an electrolytic solution. This will be described in detail later with reference to FIG. 3 In addition, as another function (role) of the insulator 1, the insulating plate 13 can insulate the first electrode 2 and the second electrode from the can 11. The insulating plate 13 has a plurality of holes 21 in order to collect, with the non-woven fabric 12, contamination (for example, metal contamination) mixed in the manufacturing process in the injection of an electrolytic solution.

The insulating plate 13 may be any material as long as the material has an insulating function, but is preferably a thermoplastic resin such as PP, PET, or PPS. When the insulating plate 13 is a thermoplastic resin, the insulating plate 13 can be welded to the non-woven fabric 12 which is also a thermoplastic resin as well.

Preferably, the non-woven fabric 12 is made of fibers of polyester, PPS, PBT or the like, the maximum pore size is 20 to 120 μm, and the basis weight is 25 to 150 g/m$^2$. Further, the non-woven fabric 12 is preferably flexible so as to be capable of supporting in close contact with the irregularities at the end surface of a wound electrode body of the first electrode 2 and the second electrode 3. Any filter member other than the non-woven fabric 12 may be used as long as the member has a function of collecting contamination.

The cylindrical non-aqueous secondary battery 500 is, for example, a so-called lithium ion secondary battery in which the capacity of the second electrode 3 (negative electrode 3) is represented by a capacity component obtained by occlusion and release of lithium (Li) or lithium ion (L$^+$) which is an electrode reactant. The cylindrical non-aqueous secondary battery 500 has, inside the substantially hollow cylindrical battery can 11, the wound electrode body with the pair of band-shaped first electrode 2 and band-shaped second electrode 3 stacked and wound with a separator 4 interposed therebetween. The can 11 is made of iron (Fe) plated with nickel (Ni) 15, which has one end closed and the other end opened. The electrolytic solution is injected into the inside of the can 11 to impregnate the separator 4. In addition, the above-mentioned insulator 1 and an insulating body 10 are disposed perpendicularly to the winding circumferential surface so as to sandwich the wound electrode body.

A first electrode top cover 8 and a safety valve 6 and the like provided inside the first electrode top cover 8 are attached to the open end of the can 11 by crimping via a gasket 9. Thus, the inside of the can 11 is hermetically sealed. The first electrode top cover 8 is made of, for example, the same material as that of the can 11. The safety valve 6 is electrically connected to the first electrode top cover 8, and in a case in which the internal pressure of the battery reaches a pressure equal to or higher than a certain level due to an internal short circuit of the battery or heating from the outside, or the like, intended to invert a disk plate, and electrically disconnect the first electrode top cover 8 and the wound electrode body. The gasket 9 is made of, for example, an insulating material, and the surface thereof is coated with asphalt.

A first electrode tab 7 (positive electrode tab 7 in FIG. 1) is electrically connected to the first electrode 2, and a second electrode tab 5 (negative electrode tab 5 in FIG. 1) is electrically connected to the second electrode 3. The first electrode 2 (positive electrode 2) includes a first electrode current collector 19 (positive electrode current collector 19 in FIG. 1) and a first electrode active material layer 18 (positive electrode active material layer 18 in FIG. 1) provided on both sides of the first electrode current collector 19. On the other hand, the second electrode 3 (negative electrode 3) includes a second electrode current collector 16 (negative electrode current collector 16 in FIG. 1) and a second electrode active material layer 17 (negative electrode active material layer 17 in FIG. 1) provided on both sides of the second electrode current collector 16.

The first electrode current collector 19 is made of, for example, a metal foil such as an aluminum foil. The first electrode active material layer 18 includes, for example, one or more first electrode materials (positive electrode materials) capable of occluding and releasing lithium (Li) or a lithium ion (Li$^+$) as a first electrode active material (positive electrode active material), and if necessary, contains a conducting agent such as graphite and a binder such as polyvinylidene fluoride. Examples of the first electrode material (positive electrode material) include, for example, lithium-containing compounds such as a lithium oxide, a lithium phosphate, a lithium sulfide, or an interlayer compound containing lithium.

The second electrode current collector 16 is made of, for example, a metal foil such as a copper foil. The second electrode active material layer 17 includes, for example, one or more second electrode materials (negative electrode materials) capable of occluding and releasing lithium (Li) or a lithium ion (Li$^+$) as a second electrode active material (negative electrode active material), and if necessary, contains a conducting agent such as graphite and a binder such as polyvinylidene fluoride. Examples of the second electrode material (negative electrode material) include, for example, carbon materials such as non-graphitizable carbon, graphitizable carbon, graphite, pyrolytic carbon, coke, glassy carbon, a fired body of organic polymer compound, carbon fibers, or activated carbon.

In FIG. 1, the secondary battery according to the first embodiment of the present technology serves as the cylindrical non-aqueous secondary battery 500, but if necessary, the secondary battery according to the first embodiment of the present technology may be a battery that has a wound electrode body housed inside a film-shaped exterior member, a so-called laminate film-type secondary battery, and examples thereof include, for example, a laminate film-type lithium ion secondary battery.

FIG. 2 is a diagram for demonstrating the function of the recess 14 of the can bottom 11a. FIG. 2(A) is a cross-sectional view of a cylindrical non-aqueous secondary battery 600 without any recess at the Bottom part (can bottom), and FIG. 2(B) is a cross-sectional view of a cylindrical non-aqueous secondary battery 501 with a recess at the Bottom part (can bottom). FIG. 2(C) is a side view illustrating the can bottom 11a after the cleavage of the recess 14. FIG. 2(D) is a top view illustrating the can bottom 11a before the cleavage of the recess 14, which is a diagram illustrating an example of the locational relation between the can bottom 11a and the recess 14. In a case where the recess 14 is prepared by pressing, the recess 14 may be referred to as a stamp.

As shown in FIG. 2, in recent years, the amount of gas generation from an electrode in the case of a combustion test is increased with increase in capacity and power (the flow of gas inside a battery 600 is indicated by an arrow R, whereas the flow of gas inside a battery 501 is indicated by an arrow W), and furthermore, the gas escape to the TOP part of the battery 600 or the battery 501 is decreased by reducing the diameter of the electrode central hole (the gas escape in the directions of arrows G to I in the battery 600, the gas escape in the directions of arrows in S to U in the battery 501). Thus, the gas pressure of in the Bottom part (can bottom) is increased. In the battery 600, gas escapes in the directions of arrows O and P, thereby causing the battery to burst. As a countermeasure, the Bottom part (can bottom) of the metal case can of the battery 501 is provided with a recess 14 (which may be a can bottom stamp) that has a gas release mechanism for releasing gas. As shown in FIG. 2(C), the recess 14 is cleaved to release gas in the direction of an arrow V. The recess 14 may be configured to have a thickness that is smaller than that of the can bottom, for example, in a circular shape or a shape similar to a circular shape, in order to open the can bottom. As shown in FIG. 1, in a case where the thickness of the can bottom 11a is denoted by Q1, the thickness of the recess 14 is denoted by Q2 that is a thickness smaller than Q1. As long as the recess 14 can be cleaved, the recess 14 may be composed of a recess without being divided, or may be divided into two or more and composed of the two or more recesses.

However, in a case where the can bottom 11a has the recess 14 and the recess 14 has a complete overlap with the hole 21 of the insulating plate 13 of the insulator 1, the can 11 may be dissolved at the time of battery overdischarge. Thus, the secondary battery according to the present technology includes an insulator that has a function of keeping the can 11 or the can bottom 11a, in particular, the recess 14 from being dissolved at the time of battery overdischarge as described above, while maintaining excellent performance of metal contamination collection and insulation, which is insulator performance.

Figure 3:
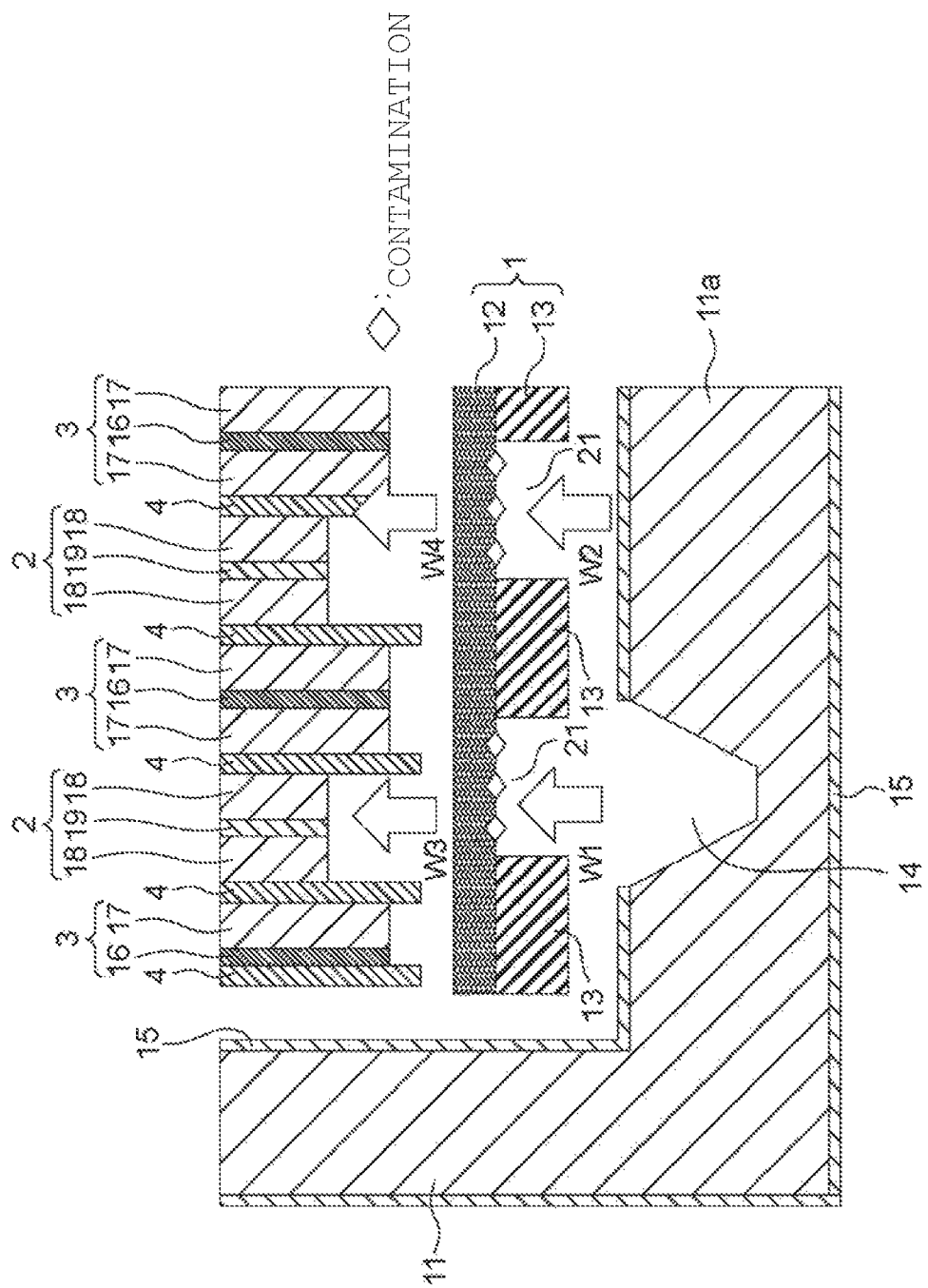
FIG. 3 is a diagram for illustrating the function of an insulator provided in the secondary battery according to an embodiment of the present technology.

FIG. 3 is a diagram for demonstrating the function of the insulator 1. The injected electrolytic solution flows in the directions of W1 to W2, passes through the holes 21 of the insulating plate 13, and further flows and then passes through the non-woven fabric 12 in the directions of W3 to W4. The non-woven fabric 12 can collect contamination (metal contamination).

Figure 4A:
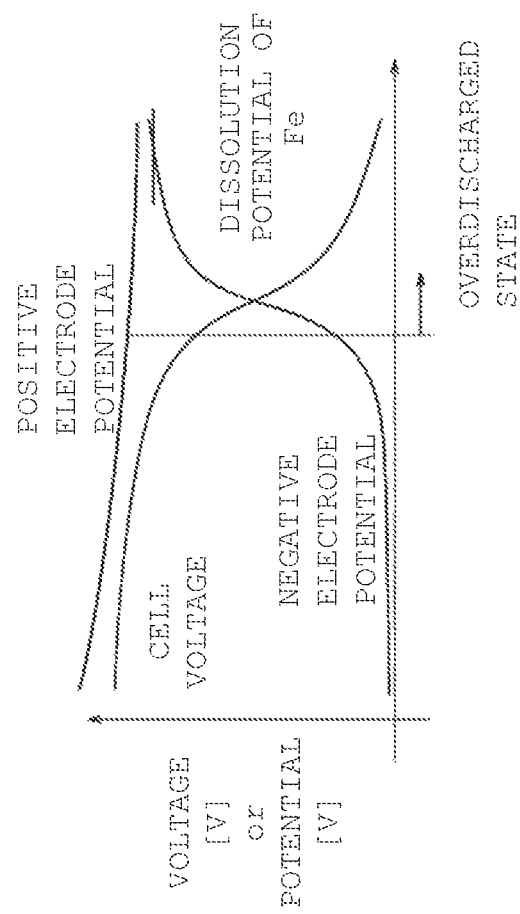
FIGS. 4(A) and 4(B) are diagrams for illustrating can bottom dissolution in the case of overdischarge in the secondary battery according to an embodiment of the present technology.
Figure 4:
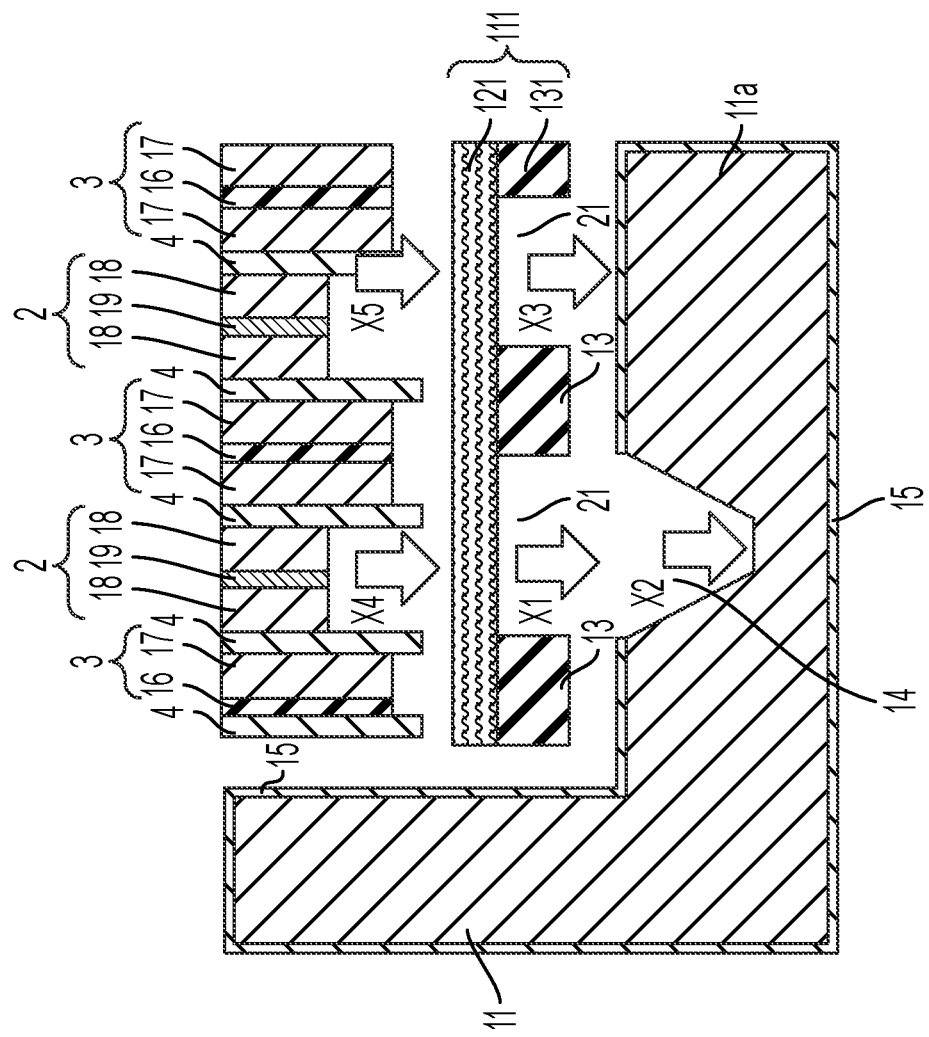
Figure 5:
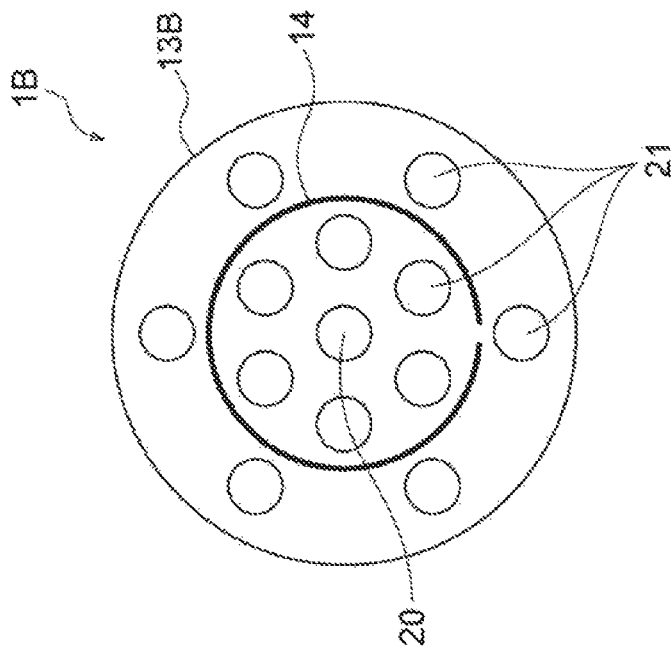
FIGS. 5(A) and 5(B) are diagrams illustrating configuration examples of the insulator provided in the secondary battery according to an embodiment of the present technology.
Figure 5:
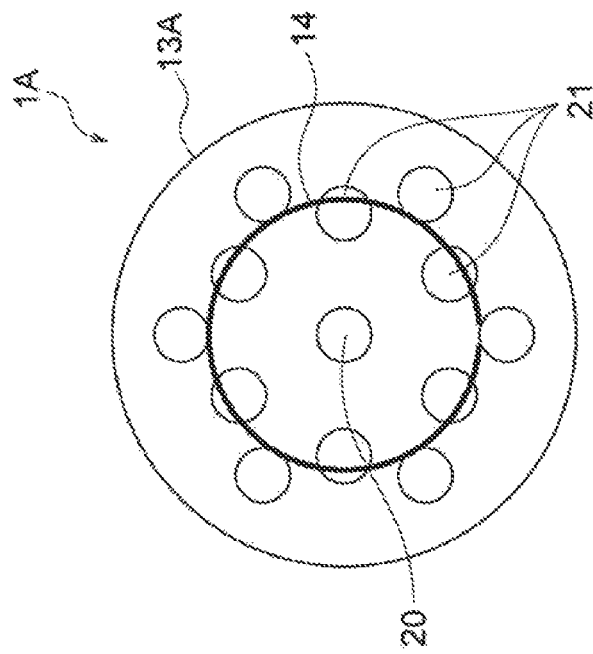

FIG. 4(A) is a graph showing the positive electrode potential, the negative electrode potential, and the cell voltage at the time of battery overdischarge, and FIG. 4(B) is a diagram for explaining the dissolution of the can bottom 11a.

As shown in FIG. 4(A), when the battery is overdischarged, the electrode potential reaches the dissolution potential of iron. Therefore, as shown in FIG. 4(B), a hole 21 of an insulator 111 including an insulating body 131 and a non-woven fabric 121 has a complete overlap with the recess 14, and as an electrolytic solution flows in X1 to X5, the can 11 (negative electrode can in FIG. 4 (B)) starts to dissolve from the inside of the battery, because the main constituent is iron. The insulating body 131 is similar in material to the insulating body 13, and the non-woven fabric 121 is similar in material to the non-woven fabric 12. As described above, the recess 14 (can bottom stamp) that has a gas release mechanism for releasing gas is may be configured to have a thickness that is smaller than that of the can bottom 11a for example, in a circular shape or a shape similar to a circular shape, in order to open the can bottom. When the electrolytic solution continues to be supplied to this thin-walled part in a high-temperature environment, iron dissolution will be accelerated, thereby generating holes in the thin-walled part of the recess 14 (can bottom stamp), and in the worst case, the electrolytic solution may be leaked.

The electrolytic solution includes a solvent and an electrolyte salt dissolved in the solvent. As the solvent, cyclic carbonates such as ethylene carbonate or propylene carbonate can be used, and in addition to these cyclic carbonates, chain carbonates may be mixed and then used. Furthermore, the solvent may contain 2,4-difluoroanisole or vinylene carbonate.

Examples of the electrolyte salt include, for example, a lithium salt, and one type of electrolyte salt may be used alone, or two or more types of electrolyte salts may be used in mixture. Examples of the lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxolato-O,O'] lithium borate, lithium bis(oxalate)borate, or LiBr.

FIGS. 5(A) and 5(B) are top views illustrating insulators 1A and 1B provided in the secondary battery according to the first embodiment of the present technology. FIGS. 5(A) and 5(B) show central holes 20 and holes 21. The holes 21 refer to all of the holes other than the central holes 20. The holes 21 may be referred to as peripheral holes in contrast to the central holes 20.

As shown in FIGS. 5(A) and 5(B), the recess 14 (can bottom stamp) is not completely overlapped with the holes 21 of an insulating plate 13A or 13B respectively included in the insulator 1A or 1B. More specifically, in the insulator 1A shown in FIG. 5(A), at least a part of the recess 14 (can bottom stamp) is not overlapped with at least part of the hole 21 of the insulating plate 13A included in the insulator 1A. In the insulator 1B shown in FIG. 5(B), the recess 14 (can bottom stamp) is not overlapped at all with the hole 21 of the insulating plate 13B included in the insulator 1B. The insulators 1A and 1B makes it possible to prevent the dissolution of recess 14 (can bottom stamp) by the electrolytic solution, caused at the time of battery overdischarge.

Figure 6:
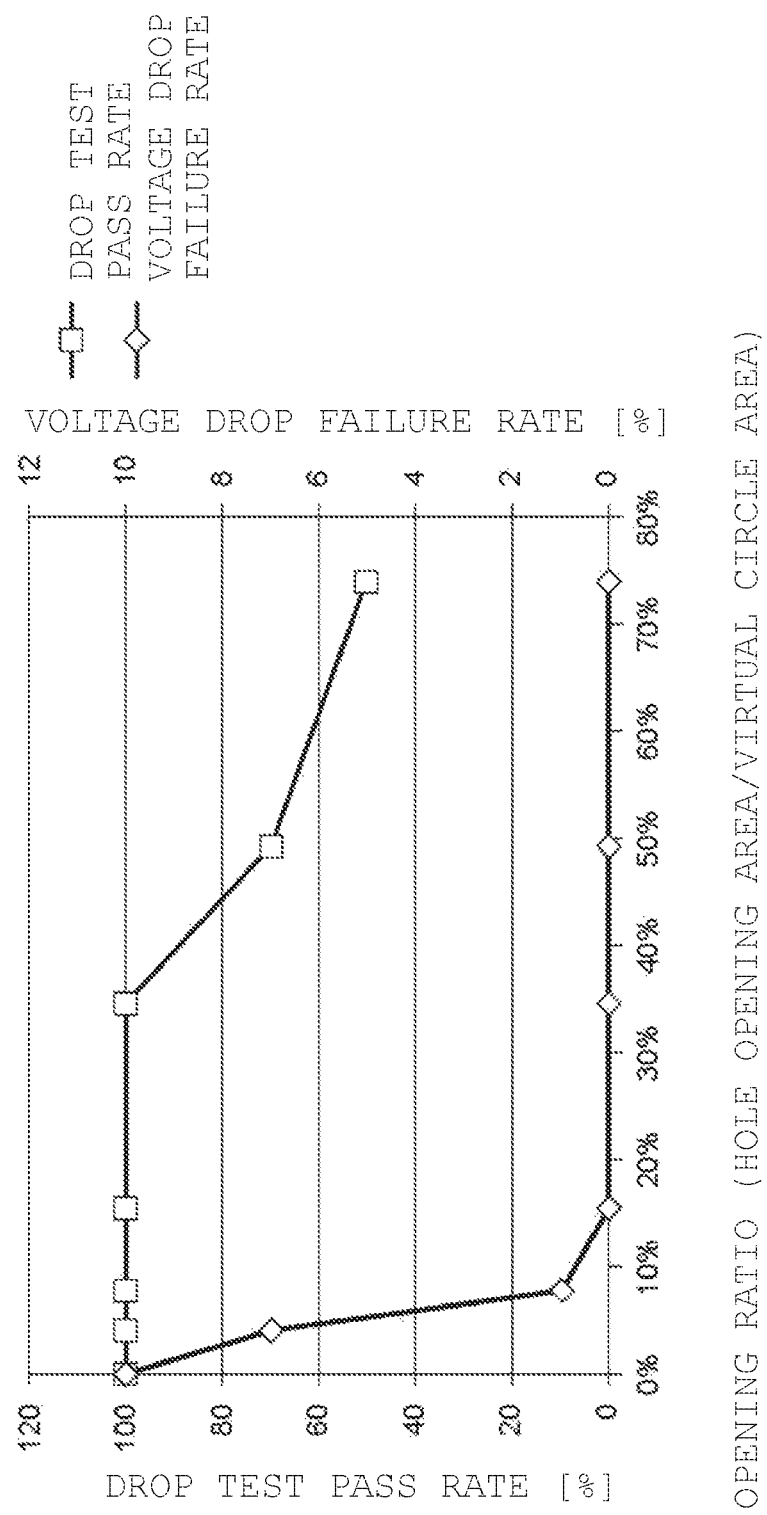
FIG. 6 is a graph showing the relationship between the opening ratio of a hole of the insulator provided in the secondary battery according to an embodiment of the present technology and a drop test pass rate or a voltage drop failure rate.

FIG. 6 is a graph showing the relationship between the opening ratio of the hole 21 of the insulator 1 provided in the secondary battery 500 according to the first embodiment of the present technology and a drop test pass rate or a voltage drop failure rate. In the battery drop test, the fact that the battery voltage is 3.0 V or higher in a case where a battery that has an open circuit voltage of 4.4±0.05 V is freely fallen 30 times from a height of 10 m is considered as a pass condition. The number of tests was 100. In the voltage drop test, which is one of so-called abuse tests, the battery was assembled and finished with a fine metal powder put in the bottom of the battery can in advance in the battery assembly step, and then charged to an open circuit voltage to 4.2±0.05 V, and the battery with a voltage drop after a lapse of 10 days in excess of 0.2 V in an atmosphere at 60° C. was regarded as a failure. The number of tests was 100. It is to be noted that this is a test for evaluating the metal contamination collection performance of the insulator 1 in a pseudo manner.

One of the functions of the insulator 1 is the metal contamination collection, and the reduced opening ratio of the hole 21 of the insulating plate 13 may slightly decrease the metal contamination collection during the injection of the electrolytic solution. When the metal contamination collection is slightly decreased, there is a possibility that metal contamination may intrude into the inside of the electrode, thereby causing a voltage drop failure in the finished battery. As shown in FIG. 6, when the opening ratio is less than 5%, the metal contamination collection is slightly decreased, and the voltage drop failure rate is slightly increased.

In addition, the insulator 1 has, as another function thereof, a function (role) of insulating the can 11 from the first electrode 2 and the second electrode 3. When the opening ratio of the hole 21 is increased, the strength of the component may be slightly decreased, and the insulation effect may be slightly decreased. In the results of the battery drop test, shown in FIG. 6, when the opening ratio reaches 40% or more, the pass rate of the battery drop test is slightly decreased.

Thus, the opening ratio of the holes of the insulating plate 13 of the insulator 1 may be an optional opening ratio, but is preferably 5 to 40%. According to this preferred aspect, a balance can be achieved between the metal contamination collection and the prevention of decrease in insulation durability.

Figure 7A:
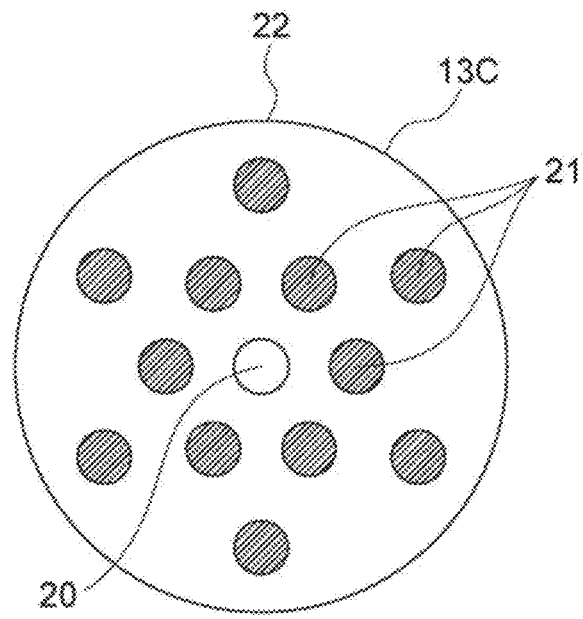
FIGS. 7(A) and 7(B) are diagrams for illustrating the opening ratio of a hole of the insulator provided in the secondary battery according to an embodiment of the present technology.
Figure 7B:
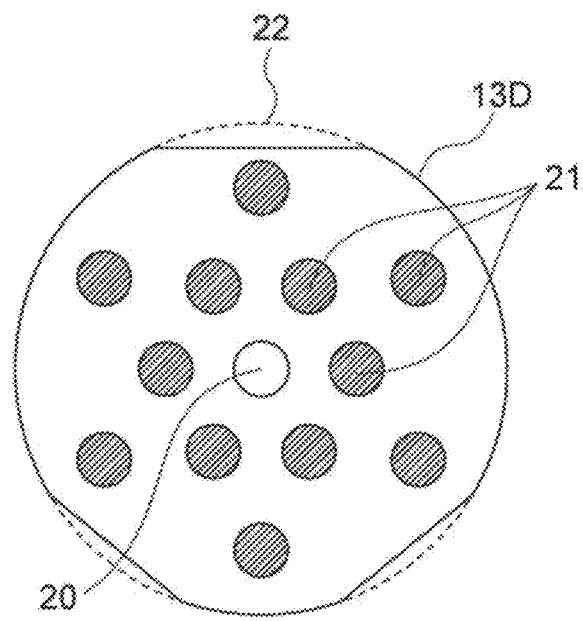

The opening ratio of the insulator 1 will be described with reference to FIG. 7. FIG. 7(A) shows an insulating plate 13C, a virtual circle 22, holes 21, and a central hole 20, and FIG. 7(B) shows an insulating plate 13D, a virtual circle 22, holes 21, and a central hole 20. The opening ratio is determined by the following formula 1.

Formula 1:opening ratio=Total Area of Holes 21/Area of Virtual Circle 22;

It should be understood that while the insulating plates 13C and 13D each have at least one hole 21, non-woven fabrics (not shown in FIG. 7) for collecting metal contamination have no hole. Further, the area of the central hole 20 is excluded from the total area of the holes 21. As shown in FIG. 7(A), the virtual circle 22 may coincide with the outer peripheral shape of the insulating plate 13C, or as shown in FIG. 7(B), in a case where the outer periphery of the insulating plate 13D has a partially notched shape, a virtual circle that is circumscribed with respect to the insulating plate 13D is regarded as the virtual circle 22.

As mentioned above, the discharge capacity of the secondary battery 500 according to the first embodiment of the present technology may be any capacity, but may be preferably 2.5 Ah or more in some cases.

In a battery that has a discharge capacity of 2.5 Ah or more, the electrode separator has a reduced thickness, and the resistance to the intrusion of metal contamination into the electrode may be thus low.

In a battery that has a battery capacity of less than 2.5 Ah, the voltage drop failure rate of the finished battery may be low even if the metal contamination collection function of the insulator 1 is somewhat decreased. Thus, in a case where the discharge capacity is 2.5 Ah or more, it may be desirable to provide the insulator 1 further with a filter member.

A secondary battery according to a second embodiment (secondary battery example 2) of the present technology will be described with reference to FIGS. 8 to 9. It is to be noted that the contents of the secondary battery according to the first embodiment of the present technology as described above can also be directly applied to the secondary battery according to the second embodiment of the present technology, except for the following description of the secondary battery according to the second embodiment of the present technology.

Figure 8:
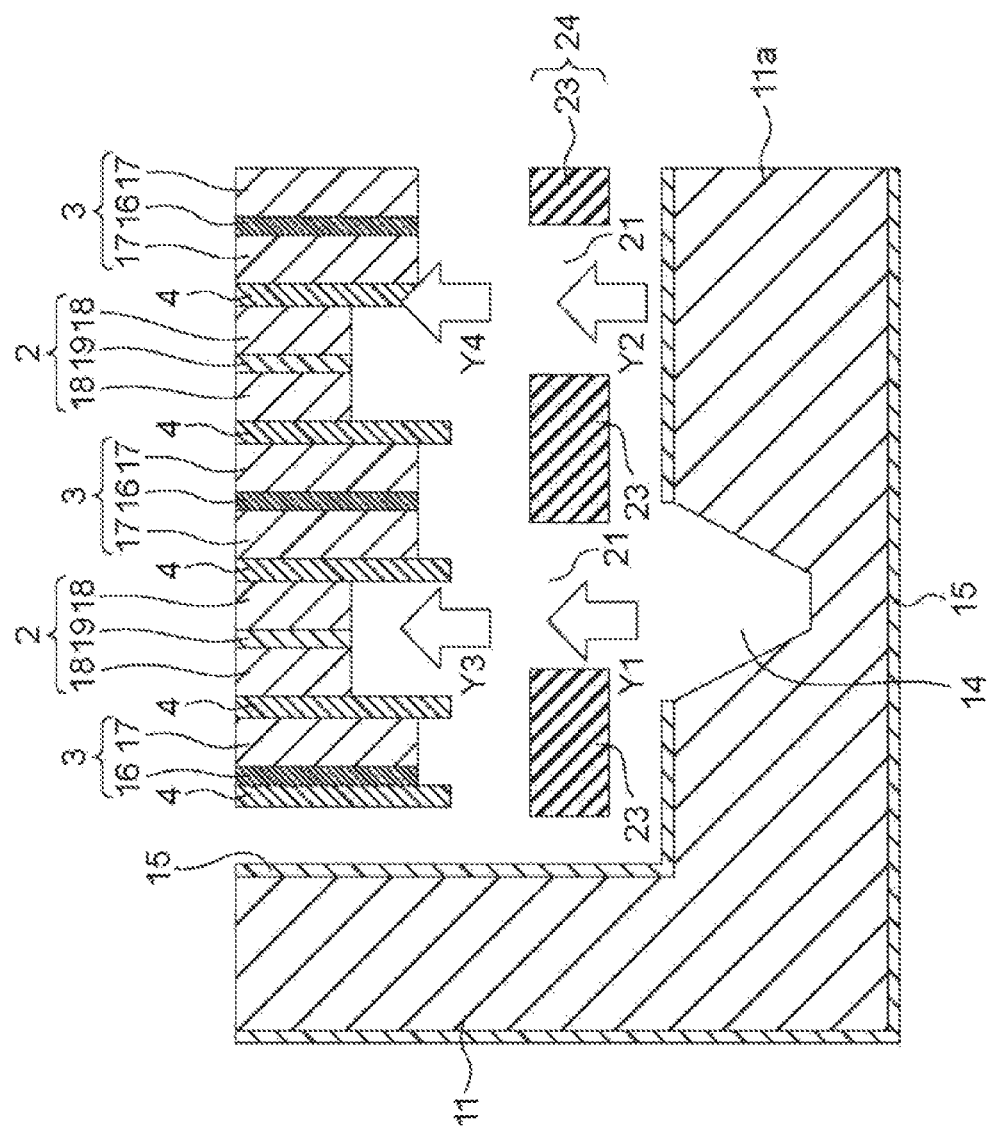
FIG. 8 is a diagram illustrating a configuration example of an insulator provided in a secondary battery according to an embodiment of the present technology.

FIG. 8 is an enlarged cross-sectional view of a part of a secondary battery according to the second embodiment of the present technology. As shown in FIG. 8, the secondary battery according to the second embodiment of the present technology includes an insulator 24 composed of an insulating plate 23. The secondary battery according to the second embodiment of the present technology has a specifications for the minimization of contamination generated, and/or has specifications for the large thickness of the separator and the strong resistance to contamination (for example, metal contamination resistance).

Figure 9:
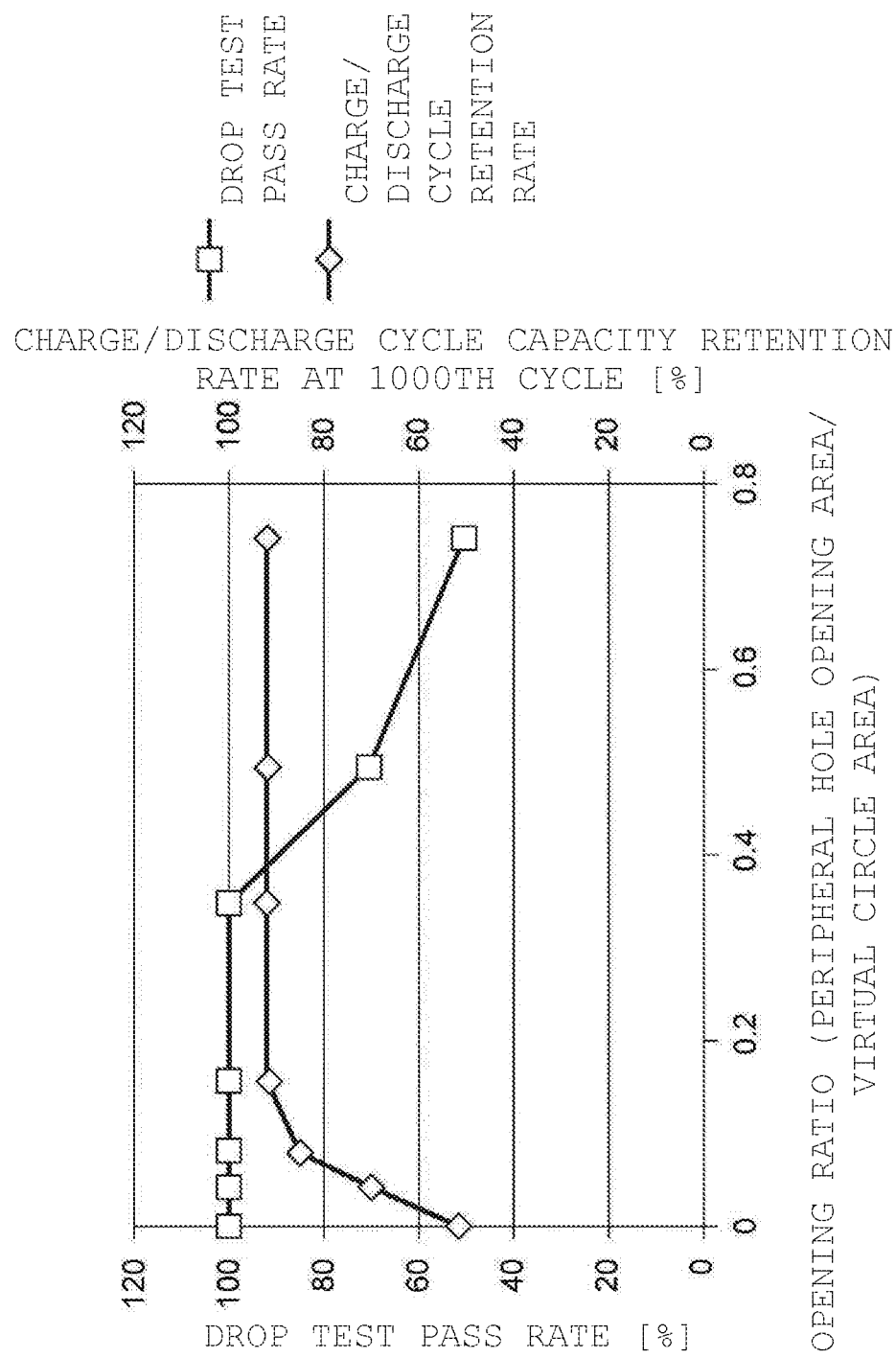
FIG. 9 is a graph showing the relationship between the opening ratio of a hole of the insulator provided in the secondary battery according to an embodiment of the present technology and a drop test pass rate or a charge/discharge cycle capacity retention rate.

FIG. 9 is a graph showing the relationship between the opening ratio of the hole 21 provided in the insulator 24 and a drop test pass rate or the charge/discharge cycle capacity retention rate. In the battery drop test, the fact that the open circuit voltage is 3.0 V or higher after a battery that has an open circuit voltage of 4.4±0.05 V is freely fallen 30 times from a height of 10 m is considered as a pass condition. The number of batteries that passed the test/the number of tests×100 was regarded as the pass rate (%). The number of tests was 100. In the case of examining the cycle characteristics, the secondary battery was charged and discharged for one cycle in an ordinary-temperature environment (23° C.) in order to stabilize the battery state, and then further charged and discharged for one cycle in the same environment, thereby measuring the discharge capacity. Subsequently, the secondary battery was repeatedly charged and discharged until the total number of cycles reached 1000 cycles in the same environment, thereby measuring the discharge capacity. From this result, the charge/discharge cycle capacity retention rate (%)=(1000th-cycle discharge capacity/2nd-cycle discharge capacity)×100 was calculated. In the case of charging, the battery was charged at constant current and constant voltage with a current of 0.2 C up to the upper limit voltage of 4.2 V, and then further charged at constant voltage until the current reached 0.05 C. In the case of discharging, the battery was discharged at constant current with a current of 0.2 C until reaching a cutoff voltage of 2.5 V. It is to be noted that the terms "0.2 C" and "0.05 C" refer respectively to current values for fully discharging the battery capacity (theoretical capacity) in 5 hours and 20 hours. For example, in the case of a battery that has a battery capacity of 2.5 Ah, the current value of 1 C is 2.5 A, and the current value of 0.2 C is 0.5 A.

The insulator 24 has no filter member such as a nonwoven fabric, thus improving the injection of the electrolytic solution, and furthermore, the high opening ratio of the hole 21 of the insulator 24 improves the impregnation of the first electrode 2 and the second electrode 3 with the electrolytic solution, thereby improving the charge/discharge cycle characteristics. As shown in FIG. 9, the opening ratio of the hole 21 of the insulator 24 may be any opening ratio, but as long as the opening ratio is 15% or more, the capacity retention rate can be kept at 90% or more in the case of performing 1000 cycles of charge and discharge.

Applications of the secondary battery will be described in detail below.

The application of the secondary battery is not particularly limited, as long as the secondary battery is applied to machines, devices, instruments, apparatuses, systems, and the like (assembly of multiple devices or the like) that can use the secondary battery as a driving power supply, a power storage source for reserve of power, or the like.

The secondary battery for use as a power supply may be a main power supply (a power supply that is used preferentially), or an auxiliary power supply (in place of a main power supply, or a power supply that is used by switching from a main power supply). When the secondary battery is used as an auxiliary power supply, the type of the main power supply is not limited to the secondary battery.

Here are applications of the secondary battery, for example: notebook personal computers, tablet computers, mobile phones (for example, smartphones), personal digital assistants (Personal Digital Assistants: PDA), imaging devices (for example, digital still cameras, digital video cameras, etc.), audio instruments (for example, portable audio players), game machines, cordless phone handsets, electronic books, electronic dictionaries, radios, headphones, navigation systems, memory cards, pacemakers, hearing aids, and electronic devices (including portable electronic devices) such as lighting devices, toys, medical devices, and robots; portable life instruments such as electric shavers; storage devices such as backup power supplies and memory cards; power tools such as electric drills and electric saws; battery packs used for notebook-type personal computers or the like as a detachable power supply; medical electronic devices such as pacemakers and hearing aids; vehicles used for electric cars (including hybrid cars); and electric storage systems such as a domestic battery system that stores electric power in preparation for emergency or the like. Of course, the application may be any other application than the foregoing.

Above all, it is effective to apply the secondary battery to a battery pack, a vehicle, an electric storage system, a power tool, an electronic device, and the like. This is because, since excellent battery characteristics are required, the use of the secondary battery according to the present technology can improve the performance in an effective manner. It is to be noted that the battery pack is a power supply that uses a secondary battery, and is a so-called assembled battery or the like. The vehicle is a vehicle that operates (travels) with the secondary battery as a driving power supply, and may be a vehicle (a hybrid car or the like) also provided with a driving source other than the secondary battery as mentioned above. Examples of the electric storage system, for example, an electric storage system for houses, which is a system that uses the secondary battery as a power storage source. For an electric storage system, electric power is stored in the secondary battery which serves as a power storage source, thus making it possible to use power consumption devices, for example, home electric appliances through the use of the electric power. The power tool is a tool which makes a movable part (such as a drill, for example) movable with the secondary battery as a driving power supply. The electronic device is a device that performs various functions with the secondary battery as a driving power supply (power supply source).

In this regard, some application examples of the secondary battery will be specifically described. It is to be noted that the configuration of each application example described below is just considered by way of example, and can be changed appropriately.

The battery pack according to the third embodiment of the present technology is a battery pack including the secondary battery according to the first embodiment of the present technology or the secondary battery according to the second embodiment of the present technology, a control unit that controls the usage state of the secondary battery, and a switch unit that switches the usage state of the secondary battery in accordance with an instruction from the control unit. The battery pack according to the third embodiment of the present technology includes the secondary battery according to the first embodiment of the present technology or the secondary battery according to the second embodiment of the present technology, which has excellent battery characteristics and excellent reliability, thus leading to improvements in battery pack performance and reliability.

The battery pack according to the third embodiment of the present technology will be described below with reference to the figure.

Figure 14:
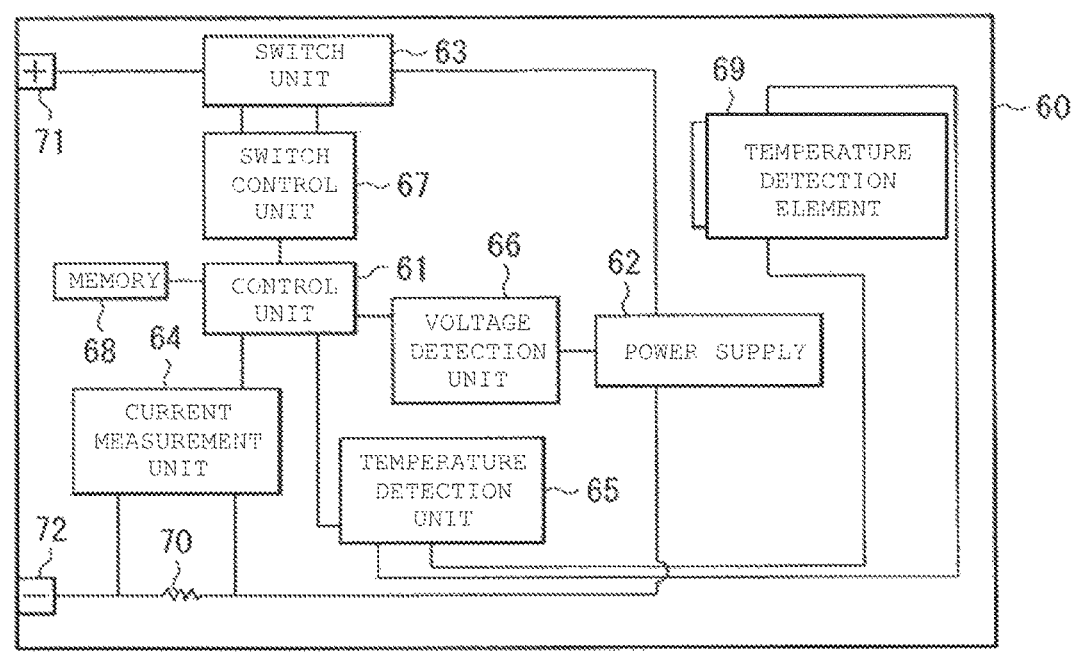
FIG. 14 is a block diagram illustrating the configuration of an application example (battery pack) of a secondary battery according to an embodiment of the present technology.

FIG. 14 shows a block configuration of the battery pack. This battery pack includes, for example, inside a housing 60 formed from a plastic material or the like, a control unit (controller) 61, a power supply 62, a switch unit (switch) 63, a current measurement unit 64, a temperature detection unit 65, a voltage detection unit 66, a switch control unit 67, a memory 68, a temperature detection element 69, a current detection resistor 70, a positive electrode terminal 71, and a negative electrode terminal 72.

The control unit 61 intended to control the operation (including the usage state of the power supply 62) of the whole battery pack, includes, for example, a central processing unit (CPU), or a processor or the like. The power supply 62 includes one or more secondary batteries (not shown). This power supply 62 is, for example, an assembled battery including two or more secondary batteries, and the connection form of the secondary batteries may be a connection in series, a connection in parallel, or a mixed type of the both. To give an example, the power supply 62 includes six secondary batteries connected in the form of two in parallel and three in series.

In response to an instruction from the control unit 61, the switch unit 63 is intended to switch the usage state of the power supply 62 (availability of the connection between the power supply 62 and an external device). This switch unit 63 includes, for example, a charge control switch, a discharge control switch, a charging diode (not shown) and a discharge diode (not shown), and the like. The charge control switch and the discharge control switch serve as, for example, semiconductor switches such as a field effect transistor (MOSFET) rising a metal oxide semiconductor.

The current measurement unit 64 is adapted to measure a current through the use of the current detection resistor 70, and then output the current measurement result to the control unit 61. The temperature detection unit 65 is intended to measure a temperature through the use of the temperature detection element 69, and then output the temperature measurement result to the control unit 61. The temperature measurement result is used, for example, when the control unit 61 controls charge/discharge in the case of abnormal heat generation, when the control unit 61 executes correction processing in the case of remaining capacity calculation, and the like. The voltage detection unit 66 is intended to measure the voltage of the secondary battery in the power supply 62, convert the measured voltage from analog to digital, and supply the converted voltage to the control unit 61.

The switch control unit (switched) 67 is configured to control the operation of the switch unit 63 in response to the signals input from the current measurement unit 64 and the voltage detection unit 66.

For example, when the battery voltage reaches the overcharge detection voltage, the switch control unit 67 disconnects the switch unit 63 (charge control switch), thereby achieving control so as to keep any charging current from flowing through the current path of the power supply 62. Thus, only discharge is allowed via the discharging diode in the power supply 62. Further, the switch control unit 67 is adapted to cut off the charging current, for example, when a large current flows during charging.

In addition, for example, when the battery voltage reaches the overdischarge detection voltage, the switch control unit 67 disconnects the switch unit 63 (discharge control switch), thereby keeping any discharging current from flowing through the current path of the power supply 62. Thus, only charge is allowed via the charging diode in the power supply 62. Further, the switch control unit 67 is adapted to cut off the discharging current, for example, when a large current flows during discharging.

It should be understood that in the secondary battery, for example, the overcharge detection voltage is 4.2 V±0.05 V and the overdischarge detection voltage is, for example, 2.4 V±0.1 V.

The memory 68 is, for example, an EEPROM that is a non-volatile memory, or the like. This memory 68 stores, for example, numerical values calculated by the control unit 61, information on the secondary battery, measured at the stage of manufacturing process (for example, internal resistance in the initial state), and the like. Further, storing the full charge capacity of the secondary battery in the memory 68 makes it possible for the control unit 61 to grasp information such as the remaining capacity.

The temperature detection element 69 is intended to measure the temperature of the power supply 62 and output the measurement result to the control unit 61, and is, for example, a thermistor or the like.

The positive electrode terminal 71 and the negative electrode terminal 72 are terminals connected to an external device (for example, a laptop personal computer, etc.) operated through the use of the battery pack, an external device (for example, a charger, etc.) used for charging the battery pack, or the like. The power supply 62 is charged/discharged via the positive electrode terminal 71 and the negative electrode terminal 72.

A vehicle according to the fourth embodiment of the present technology is a vehicle including the secondary battery according to the first embodiment of the present technology or the secondary battery according to the second embodiment thereof, a driving force conversion device that converts the electric power supplied from the secondary battery according to the present technology, to a driving force, a driving unit (driver) that works in accordance with the driving force, and a vehicle control device. The vehicle according to the fourth embodiment of the present technology includes the secondary battery according to the first embodiment of the present technology or the secondary battery according to the second embodiment thereof, which has excellent battery characteristics and excellent reliability, thus leading to improvements in vehicle performance and reliability.

A vehicle according to the fourth embodiment of the present technology will be described below with reference to FIG. 15.

Figure 15:
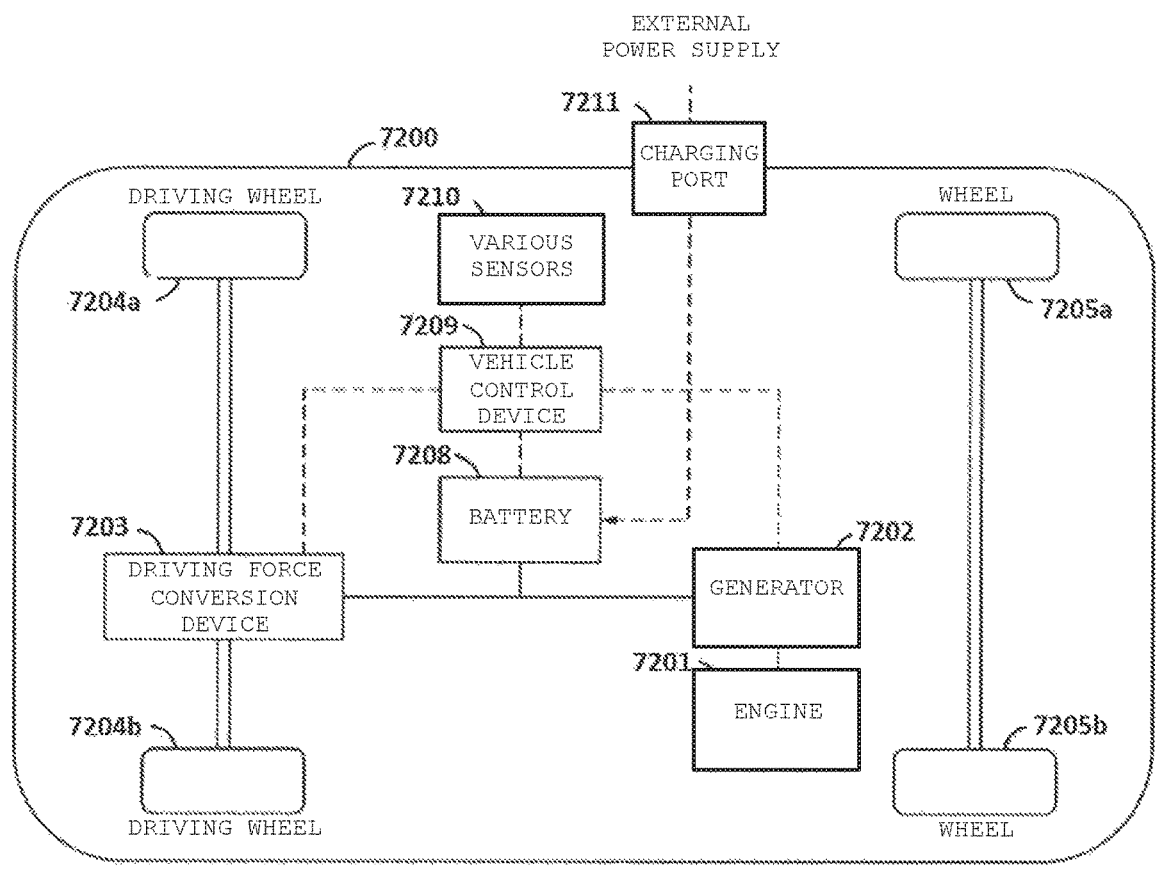
FIG. 15 is a block diagram illustrating the configuration of an application example (vehicle) of a secondary battery according to an embodiment of the present technology.

FIG. 15 schematically illustrates an example of the configuration of a hybrid vehicle that adopts a series hybrid system to which the present technology is applied. The series hybrid system is intended for a vehicle that runs on an electric power-driving force conversion device, with the use of electric power generated by a generator driven by an engine, or the electric power stored once in the battery.

The hybrid vehicle 7200 carries an engine 7201, a generator 7202, the electric power-driving force conversion device (drive force converter) 7203, a driving wheel 7204a, a driving wheel 7204b, a wheel 7205a, a wheel 7205b, a battery 7208, a vehicle control device (vehicle controller) 7209, various sensors 7210, and a charging port 7211. The electric storage device (not shown) applied to the battery 7208.

The hybrid vehicle 7200 travels with the electric power-driving force conversion device 7203 as a power source. An example of the electric power-driving force conversion device 7203 is a motor. The electric power-driving force conversion device 7203 is operated by the electric power of the battery 7208, and the torque of the electric power-driving force conversion device 7203 is transmitted to the driving wheels 7204a and 7204b. It should be understood that the electric power-driving force conversion device 7203 can be applied to both an alternate-current motor and a direct-current motor by using direct current-alternate current (DC-AC) or reverse conversion (AC-DC conversion) in a required location. The various sensors 7210 control the engine rotation speed via the vehicle control device 7209, and control the position (throttle position) of a throttle valve, not shown. The various sensors 7210 include a speed sensor, an acceleration sensor, an engine rotation speed sensor, and the like.

The torque of the engine 7201 is transmitted to the generator 7202, and the torque makes it possible to reserve, in the battery 7208, the electric power generated by the generator 7202.

When the hybrid vehicle is decelerated by a braking mechanism, not shown, the resistance force during the deceleration is applied as torque to the electric power-driving force conversion device 7203, and the regenerative electric power generated by the electric power-driving force conversion device 7203 is reserved in the battery 7208 by the torque.

The battery 7208 is connected to a power supply outside the hybrid vehicle, thereby making it also possible to receive electric power supply from the external power supply with the charging port 7211 as an input port, and then reserve the received power.

Although not shown, the vehicle may be provided with an information processing device that performs information processing related to vehicle control, based on information on the secondary battery. Examples of such an information processing device include, for example, an information processing device that displays the remaining battery level, based on information on the remaining level of the battery.

It should be understood that as an example, the series hybrid vehicle has been described above, which runs on the motor with the use of the electric power generated by the generator driven by the engine, or the electric power stored once in the battery. However, the present disclosure can also be effectively applied to parallel hybrid vehicles which use the outputs of both an engine and a motor as a driving source, and appropriately switch three systems of running on only the engine, running on only the motor, and running on the engine and the motor. Furthermore, the present technology can also be effectively applied to so-called electric vehicles that run on driving by only a driving motor without using any engine.

An electric storage system according to the fifth embodiment of the present technology is an electric storage system including an electric storage device including the secondary battery according to the first embodiment of the present technology or the secondary battery according to the second embodiment of the present technology, a power consumption device that is supplied with electric power from the secondary battery, a control device (controller) that controls power supply to the power consumption device from the secondary battery, and a power generation device (generator) that charges the secondary battery. The electric storage system according to the fifth embodiment of the present technology includes the secondary battery according to the first embodiment of the present technology or the secondary battery according to the second embodiment of the present technology, which has excellent battery characteristics and excellent reliability, thus leading to improvements in electric storage system performance and reliability.

Figure 16:
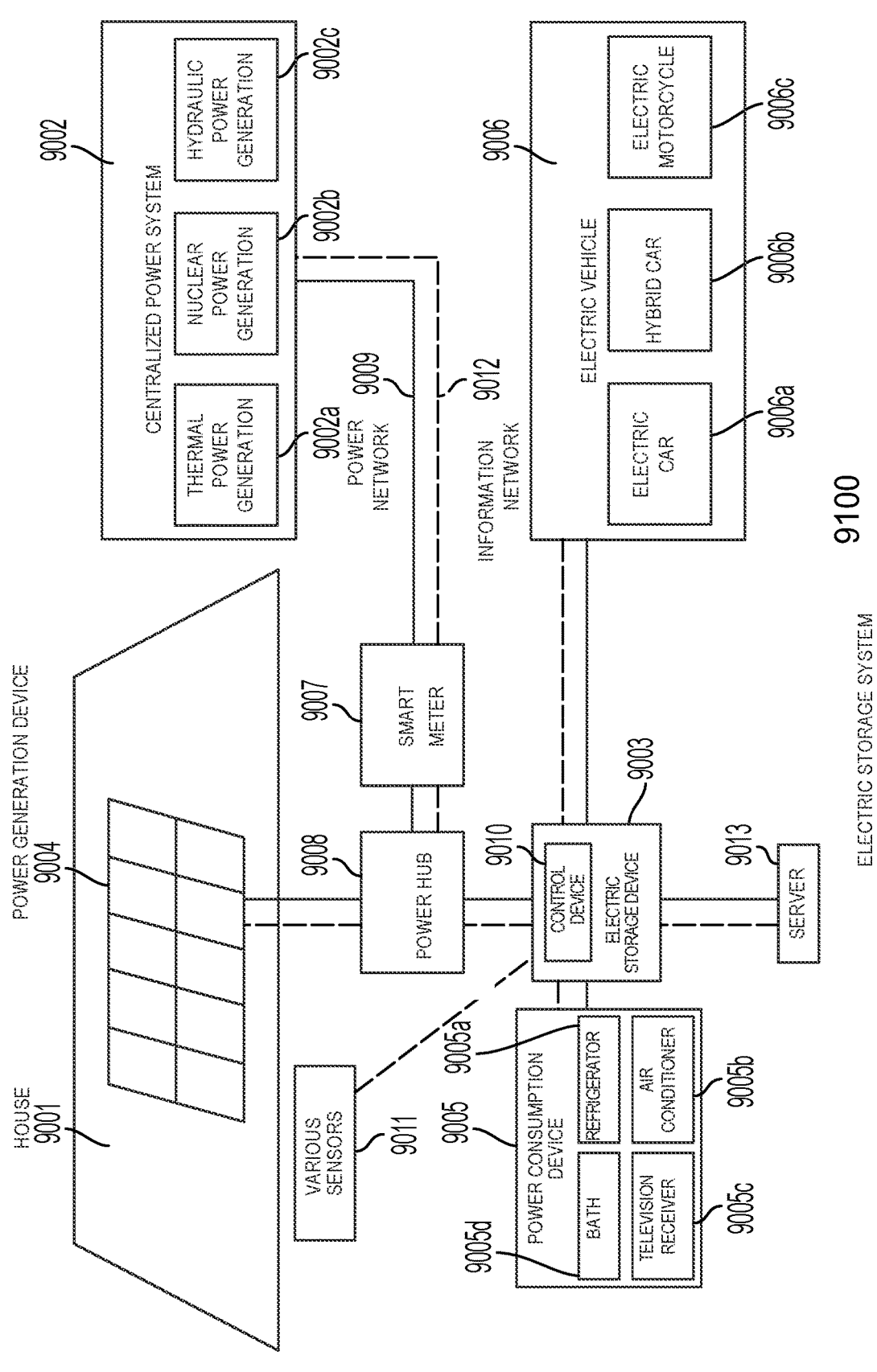
FIG. 16 is a block diagram illustrating the configuration of an application example (electric storage system) of a secondary battery according to an embodiment of the present technology.

An electric storage system for houses, which is an example of the electric storage system according to the fifth embodiment of the present technology, will be described below with reference to FIG. 16.

For example, in an electric storage system 9100 for a house 9001, electric power is supplied to an electric storage device 9003 via a power network 9009, an information network 9012, a smart meter 9007, a power hub 9008, and the like, from a centralized power system 9002 such as a thermal power generation 9002a, a nuclear power generation 9002b, and a hydraulic power generation 9002c. At the same time, electric power is supplied to the electric storage device 9003 from an independent power supply such as a home power generation device 9004. The electric power supplied to the electric storage device 9003 is stored. Electric power for use in the house 9001 is supplied through the use of the electric storage device 9003. The same electric storage system can be used not only for the house 9001 but also for buildings.

The house 9001 is provided with the power generation device 9004, a power consumption device 9005, the electric storage device 9003, a control device 9010 for controlling the respective devices, the smart meter 9007, and sensors 9011 for acquiring various types of information. The respective devices are connected by the power network 9009 and the information network 9012. As the power generation device 9004, a solar cell, a fuel cell, or the like is used, and electric power generated is supplied to the power consumption device 9005 and/or the electric storage device 9003. The power consumption device 9005 refers to a refrigerator 9005a, an air conditioner 9005b, a television receiver 9005c, a bath 9005d, and the like. Furthermore, the power consumption device 9005 includes an electric vehicle 9006. The electric vehicle 9006 refers to an electric car 9006a, a hybrid car 9006b, and an electric motorcycle 9006c.

The above-described battery unit according to the present disclosure is applied to the electric storage device 9003. The electric storage device 9003 is composed of a secondary battery or a capacitor. For example, the device is composed of a lithium ion battery. The lithium ion battery may be stationary or may be used in the electric vehicle 9006. The smart meter 9007 has the function of measuring the commercial power usage and transmitting the measured usage to the electric power company. The power network 9009 may be any one or combination of direct-current power feeding, alternate-current power feed, and contactless power feeding.

The various sensors 9011 are, for example, a human sensor, an illuminance sensor, an object detection sensor, a power consumption sensor, a vibration sensor, a contact sensor, a temperature sensor, an infrared sensor, and the like. Information acquired by the various sensors 9011 is transmitted to the control device 9010. With the information from the sensor 9011, weather condition, the human condition, etc. can be grasped to control the power consumption device 9005 automatically controlled, and thus minimize the energy consumption. Furthermore, the control device 9010 can transmit information on the house 9001 to an external electric power company or the like via the Internet.

The power hub 9008 performs processing such as power line branching and DC/AC conversion. Examples of the communication method of the information network 9012 connected to the control device 9010 include a method of using a communication interface such as a UART (Universal Asynchronous Receiver-Transmitter: transmission/reception circuit for asynchronous serial communication), and a method of using a sensor network in accordance with a wireless communication standard, such as Bluetooth (registered trademark), ZigBee, and Wi-Fi. The Bluetooth (registered trademark) system, which is applied to multimedia communication, can perform one-to-many connection communication. The ZigBee uses the physical layer of the IEEE (Institute of Electrical and Electronics Engineers) 802.15.4. The IEEE 802.15.4 is a name of a short range wireless network standard referred to as PAN (Personal Area Network) or W (Wireless) PAN.

The control device 9010 is connected to an external server 9013. This server 9013 may be managed by any of the house 9001, an electric power company, and a service provider. The information transmitted and received by the server 9013 is, for example, power consumption information, life pattern information, power charges, weather information, natural disaster information, and information on electric power trade. These pieces of information may be transmitted and received from a power consumption device (for example, a television receiver) in the home, and may be transmitted and received from a device outside the home (for example, a mobile phone). These pieces of information may be displayed on a device that has a display function, for example, a television receiver, a mobile phone, a personal digital assistant (PDA), or the like.

The control device 9010 that controls each unit is composed of a CPU or a processor, a RAM (Random Access Memory), a ROM (Read Only Memory), and the like, and stored in the electric storage device 9003 in this example. The control device 9010 connected to the electric storage device 9003, the home power generation device 9004, the power consumption device 9005, the various sensors 9011, the server 9013 via the information network 9012, has the function of regulating, for example, the commercial power usage and the power generation. Further, the device may have a function such as handling a power trade in the power market.

As described above, the electric storage device 9003 can store therein electric power generated by not only the centralized power system 9002 such as the thermal power 9002a, the nuclear power 9002b, and the hydraulic power 9002c, but also the home power generation device 9004 (solar power generation, wind power generation). Therefore, even if the home power generation device 9004 fluctuates in generated power, it is possible to achieve control such as making the amount of power sent to the outside constant or discharging the power as needed. For example, the system can also be used such that electric power obtained by solar power generation is stored in the electric storage device 9003, and at night, night-time power at a lower rate is stored in the electric storage device 9003, and then, the power stored by electric storage device 9003 is discharged and used in the daytime at a higher rate.

It should be understood that while an example of the control device 9010 stored in the electric storage device 9003 has been described in this example, the control device 9010 may be stored in the smart meter 9007, or may be configured alone. Furthermore, the electric storage system 9100 may be used for multiple homes in multiple dwelling houses, or may be used for multiple detached houses.

A power tool according to the sixth embodiment of the present technology is a power tool including the secondary battery according to the first embodiment of the present technology or the secondary battery according to the second embodiment of the present technology and a movable part that is supplied with electric power from the secondary battery. The power tool according to the sixth embodiment of the present technology includes the secondary battery according to the first embodiment of the present technology or the secondary battery according to the second embodiment thereof, which has excellent battery characteristics and excellent reliability, thus leading to an improvement in power tool performance and reliability.

A power tool according to the sixth embodiment of the present technology will be described below with reference to FIG. 17.

Figure 17:
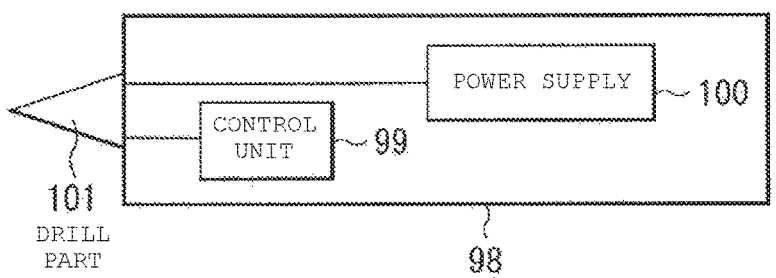
FIG. 17 is a block diagram illustrating the configuration of an application example (power tool) of a secondary battery according to an embodiment of the present technology.

FIG. 17 shows a block configuration of a power tool. This power tool is, for example, an electric drill, which includes a control unit (controller) 99 and a power supply 100 inside a tool body 98 formed from a plastic material or the like. For example, a drill part 101 as a movable part is operably (rotatably) attached to the tool body 98.

The control unit 99 intended to control the operation (including the usage state of the power supply 100) of the whole power tool, includes, for example, a CPU and the like. The power supply 100 includes one or more secondary batteries (not shown). This control unit 99 is adapted to supply electric power from the power supply 100 to the drill part 101 in response to an operation of an operation switch, not shown.

An electronic device according to the seventh embodiment of the present technology is an electronic device including the secondary battery according to the first embodiment of the present technology or the secondary battery according to the second embodiment of the present technology, where the electronic device receives power supply from the secondary battery. As described above, the electronic device according to the seventh embodiment of the present technology is a device that performs various functions with the secondary battery as a driving power supply (power supply source). The electronic device according to the seventh embodiment of the present technology includes the secondary battery according to the first embodiment of the present technology or the secondary battery according to the second embodiment of the present technology, which has excellent battery characteristics and excellent reliability, thus leading to improvements in electronic device performance and reliability.

Figure 18:
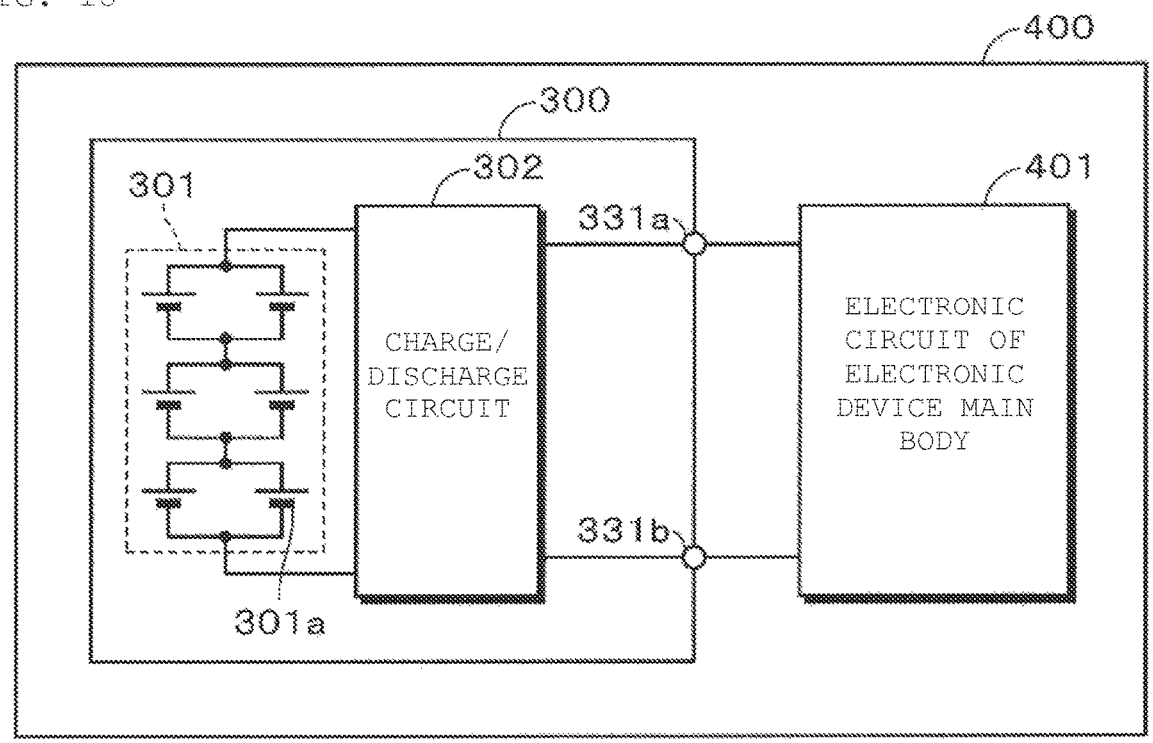
FIG. 18 is a block diagram illustrating the configuration of an application example (electronic device) of a secondary battery according to an embodiment of the present technology.

An electronic device according to the seventh embodiment of the present technology will be described below with reference to FIG. 18.

An example of the configuration of the electronic device 400 according to the seventh embodiment of the present technology will be described. The electronic device 400 includes an electronic circuit 401 of an electronic device main body, and the battery pack 300. The battery pack 300 is electrically connected to the electronic circuit 401 via a positive electrode terminal 331a and a negative electrode terminal 331b. The electronic device 400 has, for example, a configuration that allows the user to attach/detach the battery pack 300. It is to be noted that the configuration of the electronic device 400 is not limited thereto, and the battery pack 300 may be configured to be built in the electronic device 400 so that the user is not allowed to remove the battery pack 300 from the electronic device 400.

In the case of charging the battery pack 300, the positive electrode terminal 331a and negative electrode terminal 331b of the battery pack 300 are respectively connected to a positive electrode terminal and a negative electrode terminal of a charger (not shown). On the other hand, in the case of discharging the battery pack 300 (in the case of using the electronic device 400), the positive electrode terminal 331a and negative electrode terminal 331b of the battery pack 300 are respectively connected to a positive electrode terminal and a negative electrode terminal of the electronic circuit 401.

Examples of the electronic device 400 include, but are not limited to, notebook personal computers, tablet computers, mobile phones (for example, smartphones), personal digital assistants (PDA), imaging devices (for example, digital still cameras, digital video cameras, etc.), audio instruments (for example, portable audio players), game machines, cordless phone handsets, electronic books, electronic dictionaries, radios, headphones, navigation systems, memory cards, pacemakers, hearing aids, lighting devices, toys, medical devices, and robots. As a specific example, a head-mounted display and a band-type electronic device will be described. The head-mounted display is an electronic device including an image display device, a mounting device for mounting the image display device on the head of the observer, and an attachment member for attaching the image display device to the mounting device, with the secondary battery according to the first embodiment of the present technology or the secondary battery according to the second embodiment of the present technology as a power supply for driving, and the band-type electronic device is an electronic device including a plurality of segments connected in the form of a band, a plurality of electronic components disposed in the plurality of segments, and a flexible circuit board that connects the plurality of electronic components in the plurality of segments, disposed in a serpentine shape in at least one of the segments, where, for example, the secondary batteries according to the first embodiment of the present technology or the secondary batteries according to the second embodiment of the present technology are disposed as the electronic components in the segments.

The electronic circuit 401 includes, for example, a CPU, a peripheral logic unit, an interface unit, a storage unit, and the like, and controls the overall electronic device 400.

The battery pack 300 includes an assembled battery 301 and a charge/discharge circuit 302. The assembled battery 301 is configured to have a plurality of secondary batteries 301a connected in series and/or in parallel. The plurality of secondary batteries 301a are connected so as to arrange, for example, n batteries in parallel and m batteries in serial (n and m are positive integers). It is to be noted that FIG. 6 shows therein an example where six secondary batteries 301a are connected so as to arrange two batteries in parallel and three batteries in series (2P3S). The secondary battery according to the first embodiment or the second embodiment is used as the secondary battery 301a.

In the case of charging, the charge/discharge circuit 302 controls charging the assembled battery 301. On the other hand, in the case of discharging (that is, in the case of using the electronic device 400), the charge/discharge circuit 302 controls discharging the electronic device 400.

Effects of the present technology will be specifically described below with reference to examples. It is to be noted that the scope of the present technology is not to be considered limited to the examples.

Figure 10:
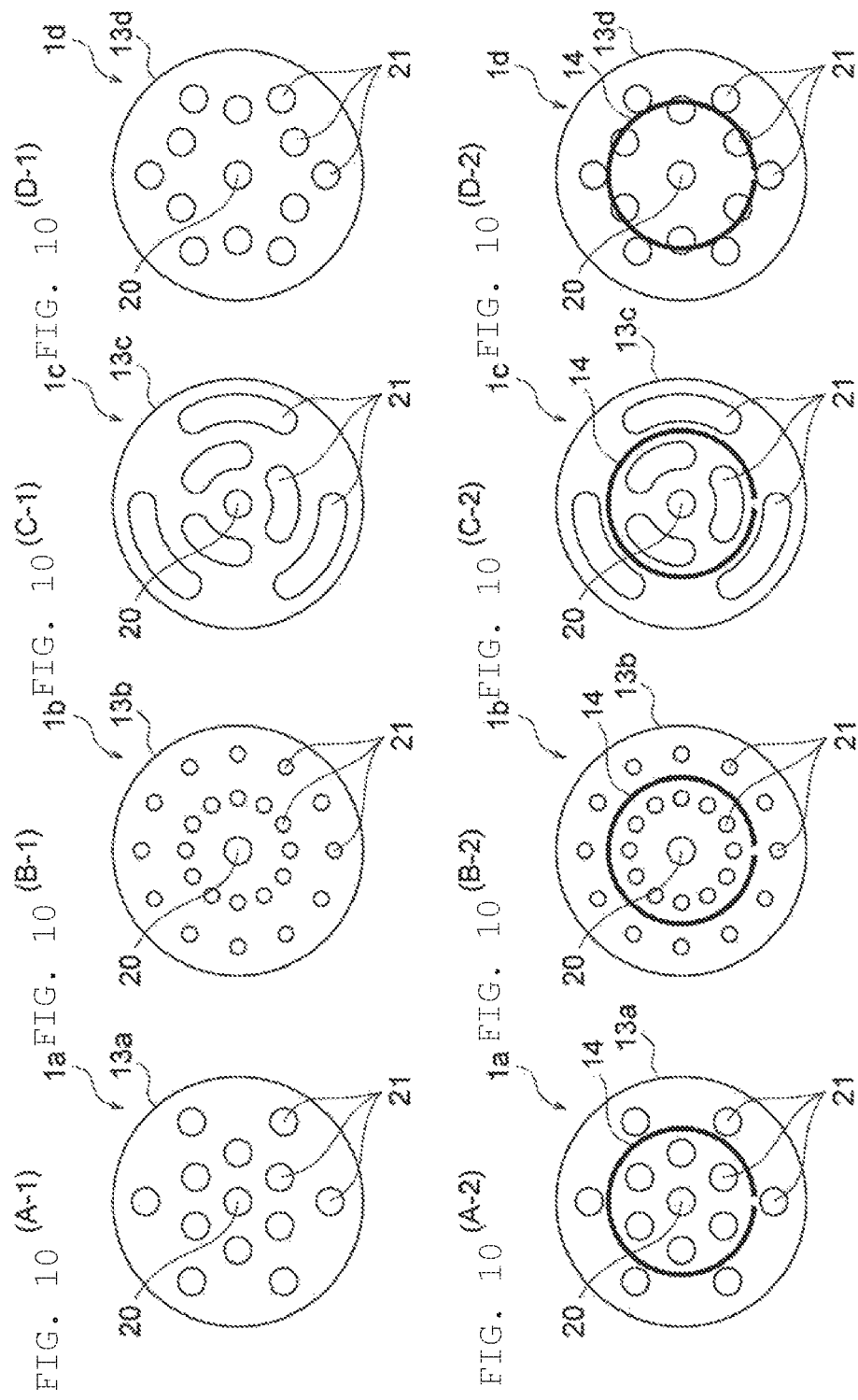
FIGS. 10(A-1), 10(A-2), 10(B-1), 10(B-2), 10(C-1), 10(C-2), 10(D-1) and 10(D-2) are diagrams illustrating configuration examples of insulators provided in secondary batteries according to embodiments of the present technology.

FIG. 10 is a top view of insulators 1a to 1d provided in secondary batteries according to Examples 1 to 4 of the present technology, which shows the positional relations between holes 21 of the insulators and recesses 14 (can bottom stamp) in the batteries. The recesses 14 (can bottom stamps) are indicated by solid lines for convenience of explanation, but in fact, the recesses 14 (can bottom prints) are hidden and unseen elsewhere than holes 21.

Example 1

As shown in FIG. 10 (A-1), the secondary battery according to Example 1 includes the insulator 1a. The insulator 1a includes an insulating plate 13a and a non-woven fabric (not shown), and the insulating plate 13a has the holes 21 and a central hole 20. The opening ratio of the hole 21 of the insulating plate 13a was 15.5%, It is to be noted that the insulator 1a provided in the secondary battery according to Example 1 may include no filter member such as a non-woven fabric.

As shown in FIG. 10 (A-2), there was no overlap between the twelve holes 21 of the insulator 1a (insulating plate 13a) and the recess 14 (can bottom stamp).

Example 2

As shown in FIG. 10 (B-1), the secondary battery according to Example 2 includes the insulator 1b. The insulator 1b includes an insulating plate 13b and a non-woven fabric (not shown), and the insulating plate 13b has the holes 21 and a central hole 20. The opening ratio of the hole 21 of the insulating plate 13b was 7.7%. It is to be noted that the insulator 1b provided in the secondary battery according to Example 2 may include no filter member such as a non-woven fabric.

As shown in FIG. 10 (B-2), there was no overlap between the twenty-four holes 21 of the insulator 1b (insulating plate 13b) and the recess 14 (can bottom stamp). For the secondary battery according to Example 2, the diameter of the hole 21 was reduced. Since contamination (for example, metal contamination) is several tens of μm, the contamination can be collected even if the hole 21 is made smaller.

Example 3

As shown in FIG. 10 (C-1), the secondary battery according to Example 3 includes the insulator 1c. The insulator 1c includes an insulating plate 13c and a non-woven fabric (not shown), and the insulating plate 13c has the holes 21 and a central hole 20. The opening ratio of the hole 21 of the insulating plate 13c was 34.8%. It is to be noted that the insulator 1c provided in the secondary battery according to Example 3 may include no filter member such as a non-woven fabric.

As shown in FIG. 10 (C-2), there was no overlap between the six holes 21 of the insulator 1c (insulating plate 13c) and the recess 14 (can bottom stamp). The secondary battery according to Example 3 has a thin separator, which is suitable for specifications suitable for high capacity. The opening ratio of the insulating plate 13c was increased to enhance the ability to collect contamination (for example, metal contamination), thereby keeping the voltage drop failure rate from being increased, even in the case of the high-output and high-capacity battery with a thin separator.

Example 4

As shown in FIG. 10 (D-1), the secondary battery according to Example 4 includes the insulator 1d. The insulator 1d includes an insulating plate 13d and a non-woven fabric (not shown), and the insulating plate 13d has the holes 21 and a central hole 20. The opening ratio of the hole 21 of the insulating plate 13d was 15.5%. It is to be noted that the insulator 1d provided in the secondary battery according to Example 4 may include no filter member such as a non-woven fabric.

As shown in FIG. 10 (D-2), at least a part of each of the eleven holes 21 of the insulator 1d (insulating plate 13d) was overlapped with at least a part of the recess 14 (can bottom stamp).

Evaluation of Overlap Ratio Between Hole and Recess and Liquid Leakage Start Period The secondary batteries according to Examples 1 and 4 of the present technology and besides, secondary batteries according to Examples 5 and 6 of the present technology were evaluated for the overlap ratio between the holes and the recess and the liquid leakage start period.

FIG. 11 shows a top view of the insulators 1a and 1d to 1f provided in the secondary batteries according to Examples 1 and 4 to 6, and a diagram showing the positional relations between the insulator holes 21 and the recesses 14 (can bottom stamps) in the batteries, the results of evaluating the overlap ratio between the holes 21 and the recess 14, and the result of evaluating the liquid leakage start period from overdischarge. The recesses 14 (can bottom stamps) are indicated by solid lines for convenience of explanation, but in fact, the recesses 14 (can bottom stamps) are hidden and unseen elsewhere than holes 21.

Example 5

As shown in FIG. 11, the secondary battery according to Example 5 includes an insulator 1e. The insulator 1e includes an insulating plate 13e and a non-woven fabric (not shown), and the insulating plate 13e has holes 21 and a central hole 20. The opening ratio of the hole 21 of the insulating plate 13e was 15.5%. It is to be noted that the insulator 1e provided in the secondary battery according to Example 5 may include no filter member such as a non-woven fabric.

Example 6

As shown in FIG. 11, the secondary battery according to Example 6 includes an insulator 1f. The insulator 1f includes an insulating plate 13f and a non-woven fabric (not shown), and the insulating plate 13f has holes 21 and a central hole 20. The opening ratio of the hole 21 of the insulating plate 13f was 15.5%. It is to be noted that the insulator 1f provided in the secondary battery according to Example 6 may include no filter member such as a non-woven fabric.

Figure 12:
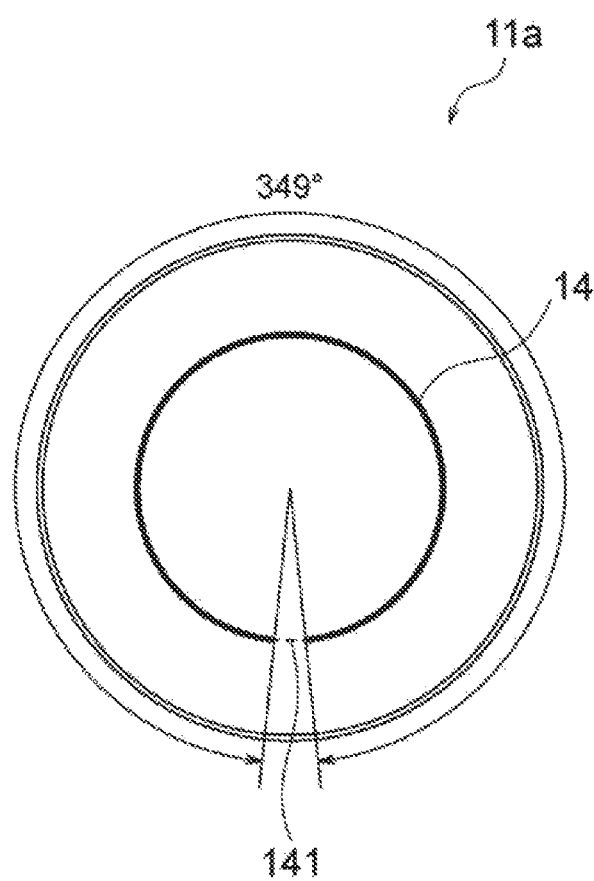
FIG. 12 is a diagram for illustrating the overlap ratio between a hole provided in an insulator and a recess of a can bottom.

As shown in FIG. 12, the recess 14 was a substantially circular undivided stamp, and the angle of the entire stamp was 349 degrees. As shown in FIG. 12, the angle of 11 degrees obtained by subtracting 349 degrees from 360 degrees for one circumference refers to an unstamped part 141.

It should be understood that the stamp angle of the recess 14 is not to be considered limited to 349 degrees, and may be 270 degrees or 360 degrees, for example, and the recess 14 may be divided into two, for example. It is also possible to change the design appropriately so that the function as an internal pressure release valve can be achieved adequately.

As for the twelve holes 21 of each of the insulators 1a and 1d to 1f according to Examples 1 and 4 to 6, the stamp angle of a part overlapped with the stamp was determined for each hole, and the stamp angles of the respective holes was added, and divided by 349 degrees to determine the overlap ratio between the holes and the recess (stamp). It should be understood that the above-mentioned angles were determined with the use of a non-contact 3D shape measuring instrument (VR-3000 manufactured by Keyence) here.

In the insulator 1a according to Example 1, there was no overlap between the twelve holes 21 and the recess 14 (stamp), and the overlap ratio between the holes and the recess was thus 0%.

In the insulator 1d according to Example 4, among the twelve holes 21, the stamp angle of the part overlapped with the recess 14 (stamp) was 9 degrees for the five holes 21, and the stamp angle of the part overlapped with the recess 14 (stamp) was 21 degrees for the six holes 21.

Thus, through the calculation of (9 degrees×5 pieces+21 degrees×6 pieces)/349 degrees×100=49.0, and the overlap ratio between the holes and the recess was 49.0%.

In the insulator 1e according to Example 5, among the twelve holes 21, the stamp angle of the part overlapped with the recess 14 (stamp) was 9 degrees for the five holes 21, and the stamp angle of the part overlapped with the recess 14 (stamp) was 11 degrees for the six holes 21.

Thus, through the calculation of (9 degrees×5 pieces+11 degrees×6 pieces)/349 degrees×100=31.8, and the overlap ratio between the holes and the recess was 31.8%.

In the insulator 1f according to Example 6, among the twelve holes 21, the stamp angle of the part overlapped with the recess 14 (stamp) was 9 degrees for the five holes 21. Thus, through the calculation of (9 degrees×5 pieces)/349 degrees×100=12.9, and the overlap ratio between the holes and the recess was 12.9%.

Here is a method for examining the period until the start of liquid leakage after the battery is overdischarged. First, the battery was charged and discharged for one cycle in accordance with the same procedure as in the case of examining the cycle characteristics. Thereafter, with the battery forcibly discharged by a 1 kΩ cement resistor connected to the positive electrode and the negative electrode, the battery was stored for 800 hours in a thermostatic bath at an environmental temperature of 45° C. Thereafter, the resistor was removed from the battery, and the open circuit voltage was measured, thereby confirming that the voltage was 0.2 V or less. Next, the battery was supported and stored in a holder with the can bottom of the battery facing downward in a thermostatic bath under a predetermined temperature condition. The condition of the can bottom of the battery was observed regularly after the start of the storage, and the period of time was measured until the visual confirmation of reddish brown rust. This is because the dissolution of the can bottom proceeds in the overdischarged state, thereby forming a hole, and leading to the leakage of the electrolytic solution inside, which produces red rust. The temperature conditions in this regard were three levels of 35° C., 45° C., and 60° C. The number of batteries was five at each level. With the use of the storage test results, the liquid leakage start period at normal temperature (23° C.) has been successfully estimated from the Arrhenius equation.

The liquid leakage start period (room temperature 25° C.) was 3 years, from the overdischarge of the secondary battery according to Example 1.

The liquid leakage start period (room temperature 25° C.) was 0.4 years, from the overdischarge of the secondary battery according to Example 4.

The liquid leakage start period (room temperature 25° C.) was 1 years, from the overdischarge of the secondary battery according to Example 5.

The liquid leakage start period (room temperature 25° C.) was 2 years, from the overdischarge of the secondary battery according to Example 6.

In general, once a battery is overdischarged, it is not possible to achieve normal charging/discharging, thereby making it impossible to use the battery as a product. If the battery further remains in the foregoing condition, the dissolution of the can bottom stamp may proceed, thereby possibly causing the electrolytic solution of the battery to leak out. However, within 2 years from the day when it becomes impossible to use the battery (over discharged state), the electrolytic solution or the like of the battery will desirably not leak out even after the battery is brought into the overdischarged state, from the viewpoint of electronic device safety. As shown in Examples 1 and 6 of FIG. 11, it has been found that as long as the overlap ratio between the holes 21 and the recess 14 (stamp) is 13% or less, the liquid leakage start period is 2 years or more. It has been found that as long as at least a part of the hole 21 and at least a part of the recess 14 (stamp) have no overlap with each other, the liquid leakage start period is further extended to 3 years. Although the overlap ratio may be any overlap ratio, it has been confirmed that the overlap ratio is preferably 13% or less.

Comparative Example 1

Figure 13:
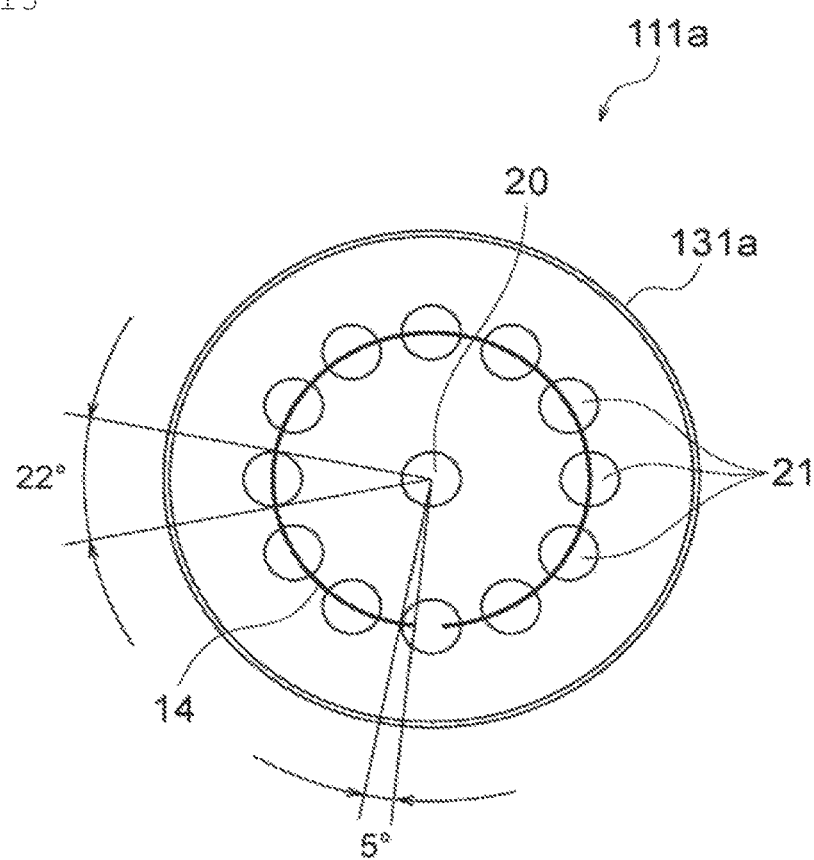
FIG. 13 is a diagram illustrating a configuration example of an insulator provided in a secondary battery.

FIG. 13 shows a top view of an insulator 111a provided in a secondary battery according to Comparative Example 1, and the positional relation between insulator holes 21 and a recess 14 (can bottom stamp) in the battery. The recesses 14 (can bottom stamps) are indicated by solid lines for convenience of explanation, but in fact, the recesses 14 (can bottom stamps) are hidden and unseen elsewhere than holes 21.

The secondary battery according to Comparative Example 1 was provided with the insulator 111a. The insulator 111a was provided with an insulating plate 131a and a non-woven fabric (not shown), with the insulating plate 131a including the holes 21 and a central hole 20. The opening ratio of the hole 21 of the insulating plate 131a was 15.5%.

As shown in FIG. 13, each of the twelve holes 21 of the insulator 111a (insulating plate 131a) is overlapped with the recess 14 (can bottom stamp).

As for the overlap ratio in the insulator 111a according to Comparative Example 1, among the twelve holes 21, the stamp angle of the part overlapped with the recess 14 (stamp) was 22 degrees for the eleven holes 21, and the stamp angles of two sites partially overlapped with the recess 14 (stamp) were 5 degrees at both of the two sites for one hole 21 (5 degrees×2 sites). Thus, through the calculation of (22 degrees×11 pieces+5 degrees×2 sites)/349 degrees×100=72.2, and the overlap ratio between the holes and the recess was 72.2%.

A method for manufacturing the insulators 1a to 1f and the insulator 111a provided in the above-mentioned secondary batteries according to Examples 1 to 6 and Comparative Example 1 will be described.

First, the holes 21 were punched out in each of the insulating plates 13a to 13f and the insulating plate 131a made of a PET processed into the shape of a tape. After forming the holes 21, the non-woven fabric processed into the form of a tape was laminated on the respective lower surfaces of the insulating plates 13a to 13f and the insulating plate 131a, and each of the insulating plates 13a to 13f and the insulating plate 131a, and a part of the non-woven fabric were fixed to each other by ultrasonic welding to finish a laminated article composed of the insulating plate and the non-woven fabric, and the respective laminated articles were wound on respective rolls. Thereafter, the respective rolls were replaced, then, the respective rolls were unwound, and the central holes 20 were punched out in the respective laminated articles, then producing the insulators 1a to 1f and the insulator 111a.

A method for manufacturing the above-mentioned secondary batteries according to Examples 1 to 6 and Comparative Example 1 will be described.

The above-mentioned secondary batteries according to Examples 1 to 6 and Comparative Example 1 are cylindrical lithium ion secondary batteries. First, a positive electrode including a positive electrode material capable of occluding and releasing lithium (Li) or lithium ion (Li$^+$) was prepared, and subsequently, a negative electrode including a negative electrode material capable of occluding and releasing lithium (Li) or lithium ion (Li$^+$) was prepared. Next, the positive electrode and the negative electrode were wound with the separator interposed therebetween. Next, the head of a positive electrode lead was welded to a safety valve, the head of a negative electrode lead was welded to a negative electrode can, and the wound positive electrode and negative electrode were sandwiched between the insulators 1a to 1f and the insulator 111a and an insulating body, and housed in the negative electrode can. Next, after the positive electrode and the negative electrode were housed in the negative electrode can, an electrolytic solution containing a phosphorus compound was injected into the negative electrode can to impregnate the separator. Next, a battery cover, the safety valve, and a thermosensitive resistive element were fixed to the opening end of the negative electrode can by crimping via a gasket, thereby preparing the secondary batteries according to Examples 1 to 6 and Comparative Example 1 (cylindrical lithium ion secondary batteries).

The present technology will be further specifically described below with reference to Application Examples 1 to 5.

Figure 19:
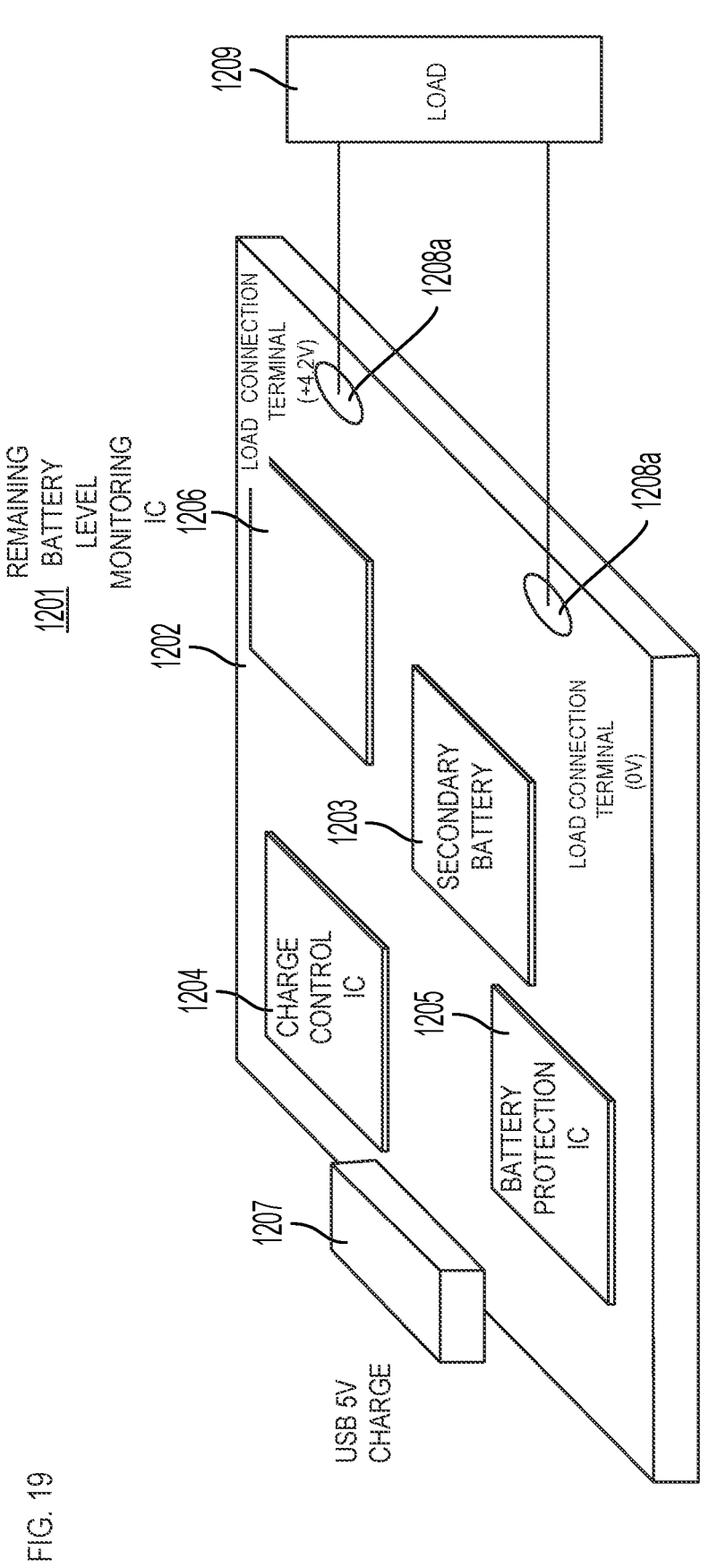
FIG. 19 is a diagram illustrating the configuration of Application Example (printed circuit board) of a secondary battery according to an embodiment of the present technology.

As shown in FIG. 19, the above-described secondary battery can be mounted together with a charging circuit and the like on a printed circuit board 1202 (Printed Circuit Board, hereinafter referred to as "PCB"), For example, a secondary battery 1203 and electronic circuits such as a charging circuit can be mounted on the PCB 1202 in accordance with a reflow step. The secondary battery 1203 and electronic circuits such as a charging circuit mounted on the PCB 1202 are referred to as a battery module 1201. The battery module 1201 is configured as a card type, as necessary, and can be configured as a portable card-type mobile battery.

In addition, a charge control IC (Integrated Circuit) 1204, a battery protection IC 1205, and a remaining battery level monitoring IC 1206 are formed on the PCB 1202. The battery protection IC 1205 controls the charging-discharging operation such that the charging voltage is not excessive at the time of charge and discharge, no overcurrent flows due to a load short circuit, and no overdischarge is caused.

A USB (Universal Serial Bus) interface 1207 is attached to the PCB 1202. The secondary battery 1203 is charged with electric power supplied through the USB interface 1207, In this case, the charging operation is controlled by the charge control IC 1204. Furthermore, predetermined electric power (for example, at a voltage of 4.2 V) is supplied to a load 1209 from load connection terminals 1208a and 1208b attached to the PCB 1202. The remaining battery level of the secondary battery 1203 is monitored by the remaining battery level monitoring IC 1206, such that a display (not shown) indicative of the remaining battery level can be recognized from the outside. It is to be noted that the USB interface 1207 may be used for load connection.

Here are specific examples of the above-described load 1209.

A. Wearable devices (sports watches, clocks, hearing aids, etc.),
B. IoT terminals (sensor network terminals, etc.),
C. Amusement devices (portable game terminals, game controllers),
D. IC substrate embedded batteries (real-time clock ICs),
E. Energy harvesting devices (electric storage elements for power generation elements such as photovoltaic power generation, thermoelectric power generation, and vibration power generation).

Currently, many people carry multiple credit cards. However, there is a problem that as the number of credit cards is increased, the risk of loss, theft, and the like is increased. Therefore, cards referred to as universal credit cards, which have functions such as multiple credit cards and club cards aggregated as all-in-one cards, have been put to practical use. In the cards, information can be captured such as the numbers and expiration dates of various credit cards and club cards, for example, and thus, if one of the cards is put in a wallet or the like, the cards can be selected and used any time.

Figure 20:
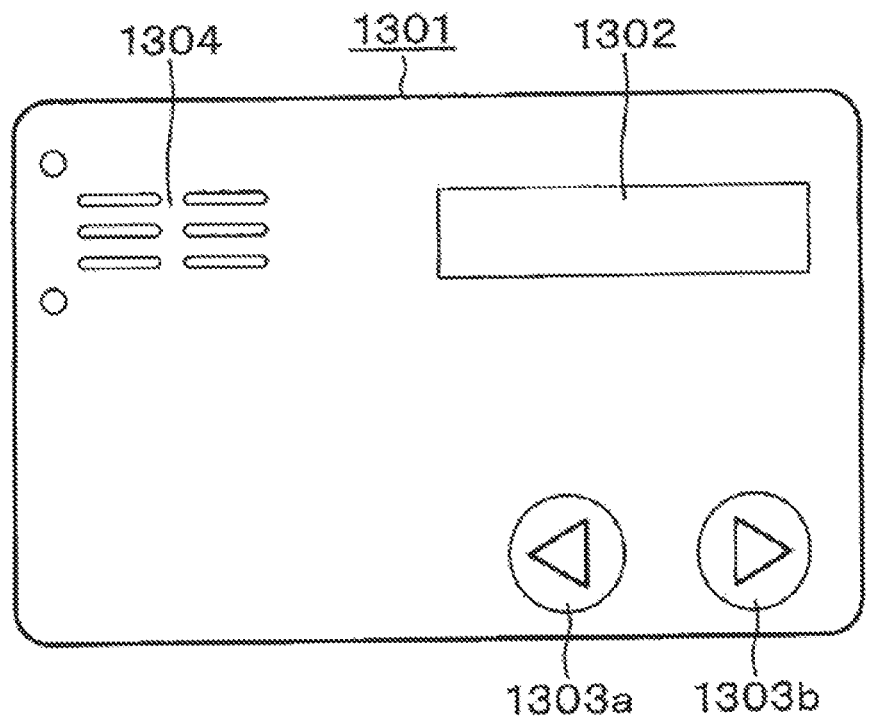
FIG. 20 is a diagram illustrating an example of the configuration of Application Example (universal credit card) of a secondary battery according to an embodiment of the present technology.

FIG. 20 shows an example of the configuration of a universal credit card 1301. The card has a card-type shape, in which an IC chip and a secondary battery (not shown) according to the present technology are embedded. Furthermore, a low power consumption display 1302 and operating parts, for example, direction keys 1303a and 1303b are provided. Furthermore, a charging terminal 1304 is provided on the surface of the universal credit card 1301.

For example, the user can specify the credit card or the like loaded in advance in the universal credit card 1301 by operating the direction keys 1303a and 1303b while viewing the display 1302. In a case in which multiple credit cards are loaded in advance, information indicating each credit card is displayed on the display 1302, and the user can specify a desired credit card by operating the direction keys 1303a and 1303b. Thereafter, the card can be used as with conventional credit cards. It is be noted that the foregoing card is considered by way of an example, and obviously, the secondary battery according to the present technology is applicable to any electronic card other than the universal credit card 1301.

Examples of the wearable terminal include wristband-type electronic devices. Among the devices, a wristband-type activity meter, also referred to as a smart band, is just wrapped around the arm, thereby making it possible to acquire data on human activities such as a step count, a travel distance, calorie consumption, an amount of sleep, and a heart rate. Furthermore, the acquired data can be managed by a smartphone. Furthermore, the meter can also be provided with a mail sending/receiving function, and for example, a wristband-type activity meter is used which has a notification feature of notifying the user of incoming mail by an LED (Light Emitting Diode) lamp and/or a vibration.

Figure 21:
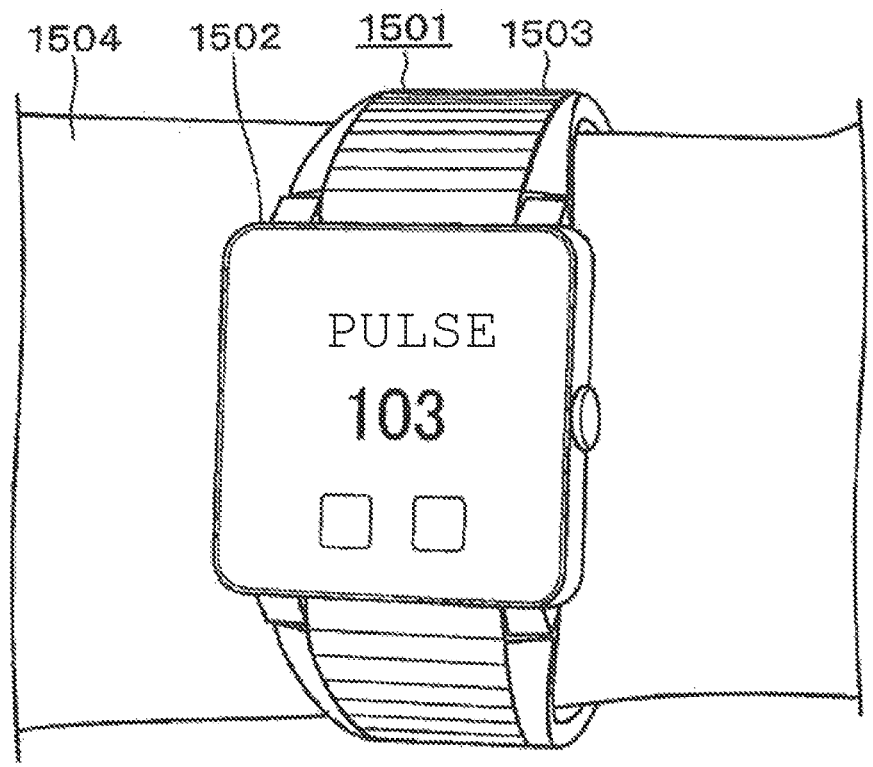
FIG. 21 is a diagram illustrating an example of the configuration of Application Example (wristband-type activity meter) of a secondary battery according to an embodiment of the present technology.
Figure 22:
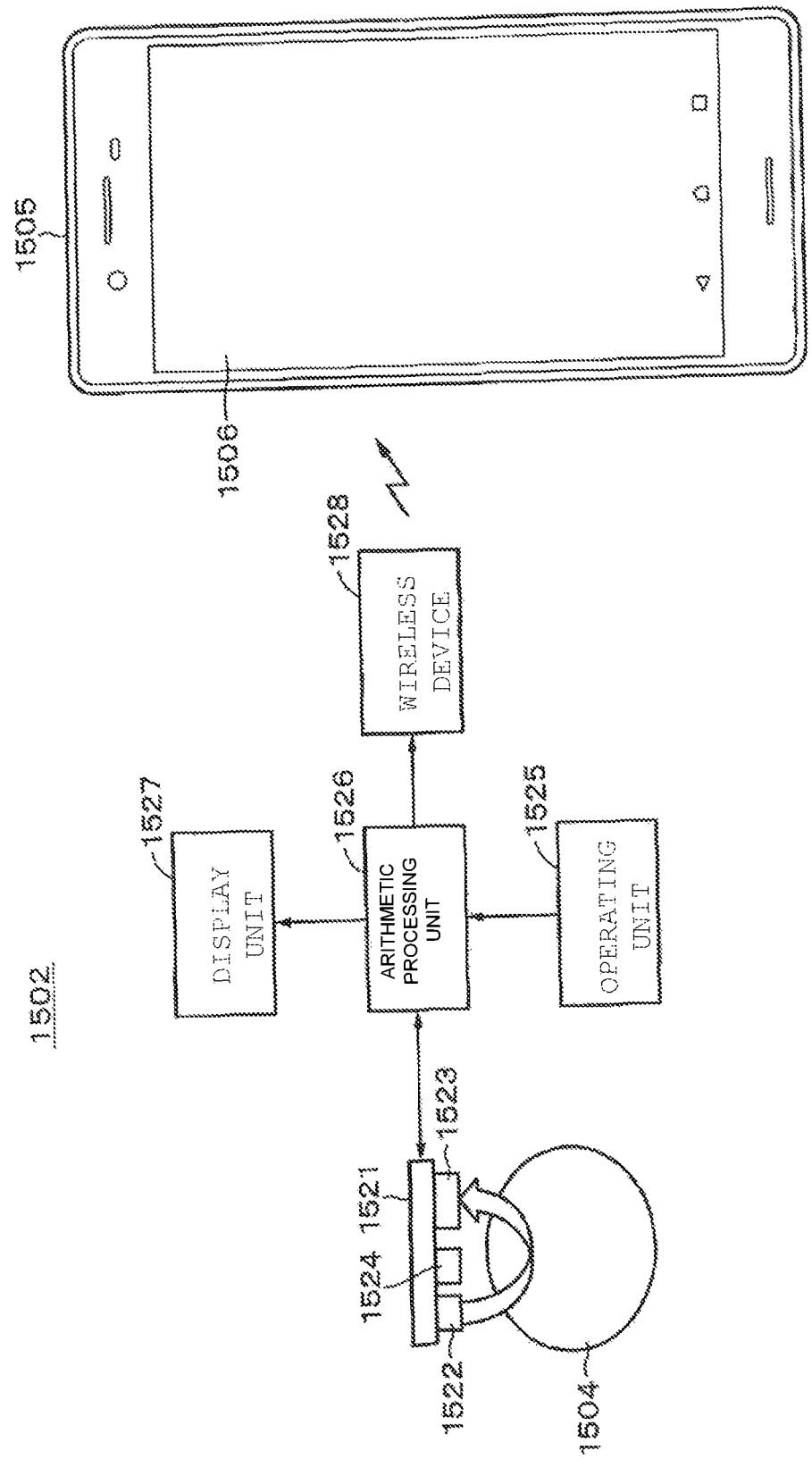
FIG. 22 is a diagram illustrating an example of the configuration of Application Example (wristband-type activity meter) of a secondary battery according to an embodiment of the present technology.

FIGS. 21 and 22 show an example of a wristband-type activity meter for measuring a pulse, for example. FIG. 21 shows a configuration example of the appearance of a wristband-type activity meter 1501. FIG. 22 shows a configuration example of a main body 1502 of the wristband-type activity meter 1501.

The wristband-type activity meter 1501 is a wristband-type measurement device for measuring, for example, a pulse of a subject by an optical method. As shown in FIG. 21, the wristband-type activity meter 1501 is composed of the main body 1502 and a band 1503, and like a wristwatch, a band 1503 is attached to an arm (wrist) 1504 of a subject. Then, the main body 1502 irradiates a part including the pulse of the arm 1504 of the subject with measurement light with a predetermined wavelength, and based on the intensity of the returned light, measures the pulse of the subject.

The main body 1502 is configured to include a substrate 1521, an LED 1522, a light-receiving IC 1523, a light-shielding body 1524, an operating unit 1525, an arithmetic processing unit 1526, a display unit 1527, and a wireless device 1528. The LED 1522, the light-receiving IC 1523, and the light-shielding body 1524 are provided on the substrate 1521. Under the control of the light-receiving IC 1523, the LED 1522 irradiates the part including the pulse of the arm 1504 of the subject with measurement light with a predetermined wavelength.

The light-receiving IC 1523 receives returned light after the arm 1504 is irradiated with the measurement light. The light-receiving IC 1523 generates a digital measurement signal indicating the intensity of the returned light, and supplies the generated measurement signal to the arithmetic processing unit 1526.

The light-shielding body 1524 is provided between the LED 1522 and the light-receiving IC 1523 on the substrate 1521. The light-shielding body 1524 prevents the measurement light from the LED 1522 from directly entering the light-receiving IC 1523.

The operating unit 1525 is composed of various types of operating members such as buttons and switches, for example, and provided on the surface of the main body 1502, or the like. The operating unit 1525 used for operating the wristband-type activity meter 1501, supplies a signal indicating the operation content to the arithmetic processing unit 1526.

The arithmetic processing unit 1526 performs arithmetic processing for measuring the pulse of the subject, based on the measurement signal supplied from the light-receiving IC 1523. The arithmetic processing unit 1526 supplies the result of the pulse measurement to the display unit 1527 and the wireless device 1528.

The display unit 1527 is composed of a display device such as an LCD (Liquid Crystal Display), for example, and provided on the surface of the main body 1502. The display unit 1527 displays the result of measuring the pulse of the subject, and the like.

The wireless device 1528 transmits the result of measuring the pulse of the subject to an external device by a predetermined method of radio communication. For example, as shown in FIG. 22, the wireless device 1528 transmits the result of measuring the pulse of the subject to a smartphone 1505, and displays the measurement result on a screen 1506 of the smartphone 1505. Furthermore, the data of the measurement result is managed by the smartphone 1505, thus allowing the measurement result to be viewed by the smartphone 1505 and stored in a server on the network. It is to be noted that any method can be adopted for the communication method of the wireless device 1528. It is to be noted that the light-receiving IC 1523 can also be used in the case of measuring a pulse at a part (for example, a finger, an earlobe, or the like) other than the arm 1504 of the subject.

The above-described wristband-type activity meter 1501 can accurately measure the pulse wave and pulse of the subject by removing the influence of body movements through signal processing in the light-receiving IC 1523. For example, even if the subject perform vigorous exercise such as running, the pulse wave and pulse of the subject can be accurately measured. In addition, for example, in a case in which the subject wears the wristband-type activity meter 1501 for a long period of time to perform a measurement, it is possible to continue to measure the pulse wave and the pulse accurately by removing the influence of body movements of the subject.

In addition, the power consumption of the wristband-type activity meter 1501 can be reduced by reducing the computation quantity. As a result, it becomes possible to perform the measurement with the wristband-type activity meter 1501 worn on the subject for a long period of time, without charging or replacing the battery, for example.

Further, as a power supply, for example, a thin battery is housed in the band 1503. The wristband-type activity meter 1501 includes the electronic circuit in the main body and a battery pack. The meter has, for example, a configuration that allows the user to attach/detach the battery pack. The electronic circuit is the circuit included in the above-described main body 1502. The present technology can be applied in the case of using the secondary battery as a battery.

Figure 23:
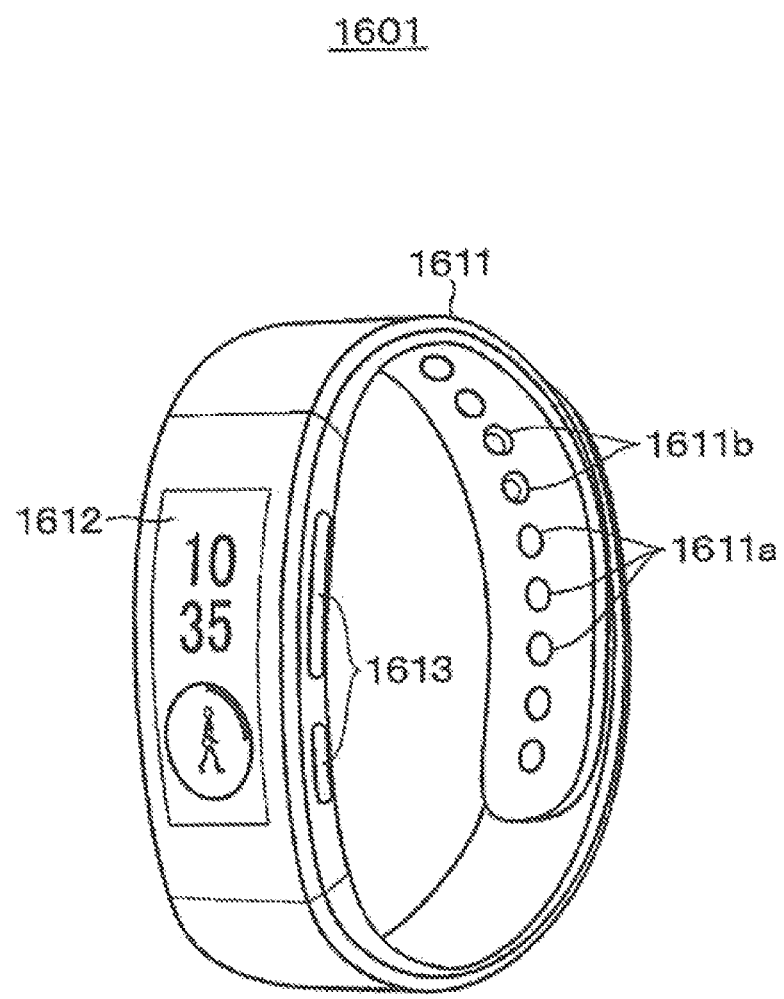
FIG. 23 is a diagram illustrating the configuration of Application Example (wristband-type electronic device) of a secondary battery according to an embodiment of the present technology.

FIG. 23 shows therein a configuration example of the appearance of a wristband-type electronic device 1601 (hereinafter referred simply to as an "electronic device 1601").

The electronic device 1601 is, for example, a so-called wearable device of a watch-type which is removable to and from a human body. The electronic device 1601 includes, for example, a band part 1611 that is worn on an arm, a display device 1612 that displays figures, words, patterns, and the like, and operation buttons 1613. The band part 1611 is formed with a plurality of holes 1611*a* and protrusions 1611*b* formed on the inner peripheral surface (the surface in contact with the arm in the case of mounting the electronic device 1601) side.

In use, the electronic device 1601 is bent such that the band part 1611 is substantially circular as shown in FIG. 23, and the protrusions 1611*b* are inserted into the holes 1611*a*, and then worn on the arm. Adjusting the positions of the holes 1611*a* into which the protrusions 1611*b* are inserted can adjust the magnitude of the diameter to correspond to the thickness of the arm. The electronic device 1601 is, out of in use, stored with the protrusions 1611*b* removed from the holes 1611*a*, and with the band part 1611 substantially flat. The sensor according to an embodiment of the present technology is provided over the entire band part 1611, for example.

A smartwatch has the same appearance as or a similar appearance to the design of an existing watch, which is worn for use on the user's arm like a watch, and has the function of informing the user of various types of messages such as incoming calls and e-mails through information displayed on a display. Furthermore, smartwatches have been also proposed which have functions such as an electronic money function and an activity meter. The smartwatch has a display incorporated in the surface of the main body part of the electronic device, and various types of information are displayed on the display. In addition, the smartwatch is also capable of, for example, via Near Field Communication such as Bluetooth (registered trademark) with a communication terminal (such as a smartphone), cooperating with the functions, contents, and the like of the communication terminal or the like.

As one of smartwatches, a smartwatch has been proposed which includes a plurality of segments connected in the form of a band, a plurality of electronic components disposed in the plurality of segments, and a flexible circuit board disposed in a serpentine shape in at least one of the segments, for connecting the plurality of electronic components in the plurality of segments. With such a serpentine shape, stress is not applied to the flexible circuit board even if the band is bent, thus preventing the circuit from being broken in. In addition, it is possible to build electronic circuit components in the band-side segments attached to the watch main body, rather than the housing constituting the watch main body, thereby eliminating the need to make a change to the watch main body side, and thus making it possible to constitute a smartwatch that has the same design as a conventional watch design. In addition, the smartwatch according to the present application example can provide notices such as e-mails and incoming calls, record logs such as a user's action history, and make calls and the like. In addition, the smartwatch has a function as a non-contact type IC card, and can make payments and conduct authentication and the like in a non-contact manner.

The smartwatch according to the present application example has, in a metallic band, built-in circuit components for performing communication processing and notification processing. In order to adapt the smartwatch to function as an electronic device, while reducing the thickness of the metallic band, the band is configured to have a plurality of segments connected, and a circuit board, a vibration motor, a battery, and an acceleration sensor are housed in each segment. Components such as the circuit board, vibration motors, battery, and acceleration sensor in each segment are connected by a flexible printed circuit board (FPC).

Figure 24:
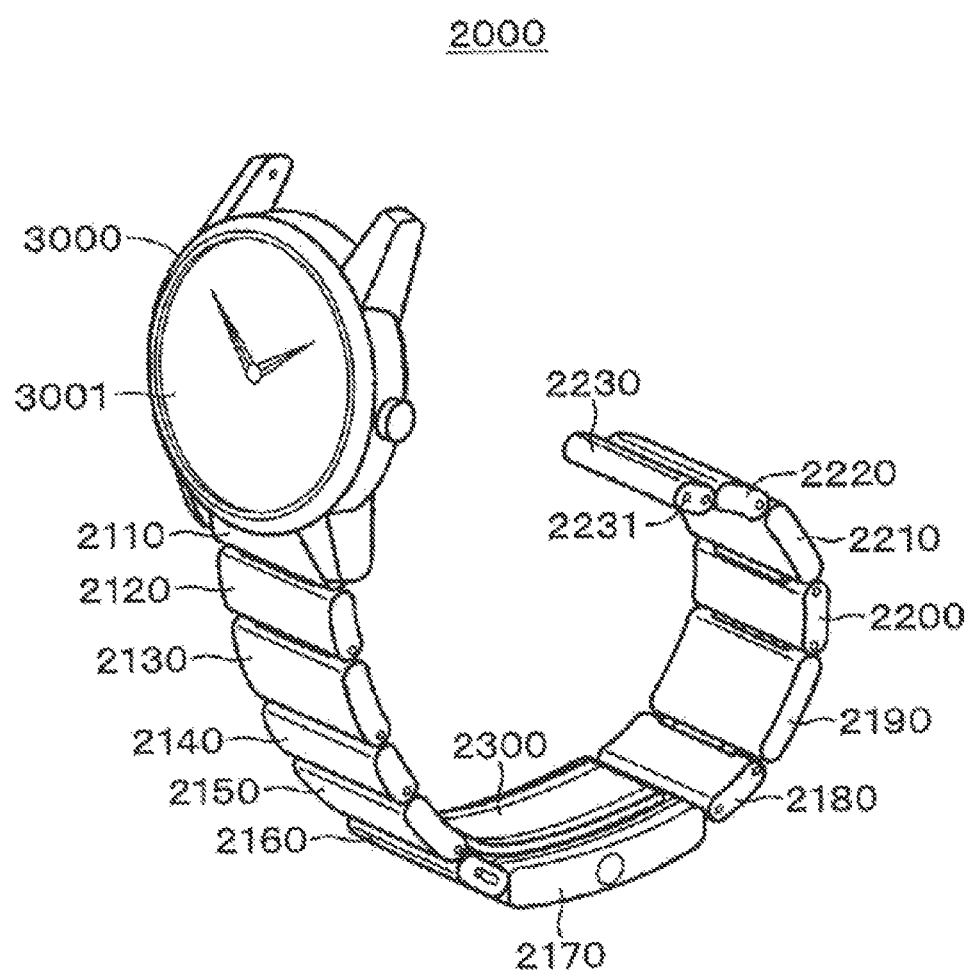
FIG. 24 is an exploded perspective view illustrating the configuration of Application Example (smartwatch) of a secondary battery according to an embodiment of the present technology.

FIG. 24 shows the overall configuration (exploded perspective view) of a smartwatch. The band-type electronic device 2000 has a metallic band attached to a watch main body 3000, which is attached to the user's arm. The watch main body 3000 includes a dial face 3100 for displaying the time. The watch main body 3000 may electronically display the time on a liquid crystal display or the like, instead of the dial face 3100.

The band-type electronic device 2000 is configured to have a plurality of segments 2110 to 2230 connected. A segment 2110 is attached to one band attachment hole of the watch main body 3000, and a segment 2230 is attached to the other band attachment hole of the watch main body 3000. According to the present example, the respective segments 2110 to are made of a metal.

Figure 25:
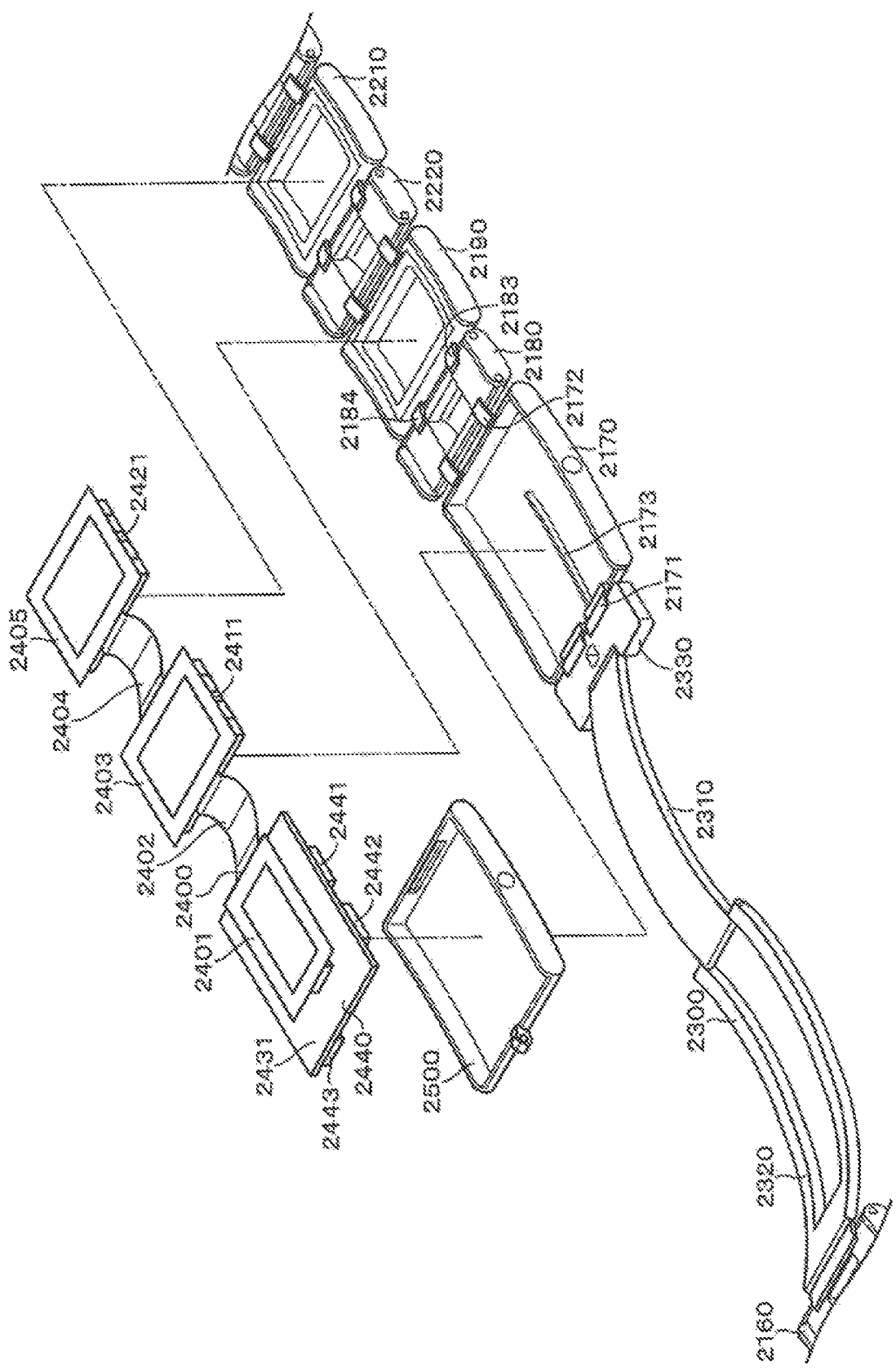
FIG. 25 is a diagram illustrating a part of the internal configuration of Application Example (band-type electronic device) of a secondary battery according to an embodiment of the present technology.

FIG. 25 shows a part of the inside configuration of the band-type electronic device 2000. For example, the inside of three segments 2170, 2180, 2190, 2200, and 2210 is shown. In the band-type electronic device 2000, a flexible circuit board 2400 is disposed in the five continuous segments 2170 to 2210. Various electronic components are disposed in the segment 2170, and batteries 2411 and 2421 according to the present technology are disposed in the segments 2190 and 2210, and these components are electrically connected by the flexible circuit board 2400. The segment 2180 between the segment 2170 and the segment 2190 has a relatively small size, where the serpentine flexible circuit board 2400 is disposed. Inside the segment 2180, the flexible circuit board 2400 is disposed to be sandwiched between waterproof members. It is to be noted that the inside of the segments 2170 to 2210 has a waterproof structure.

Figure 26:
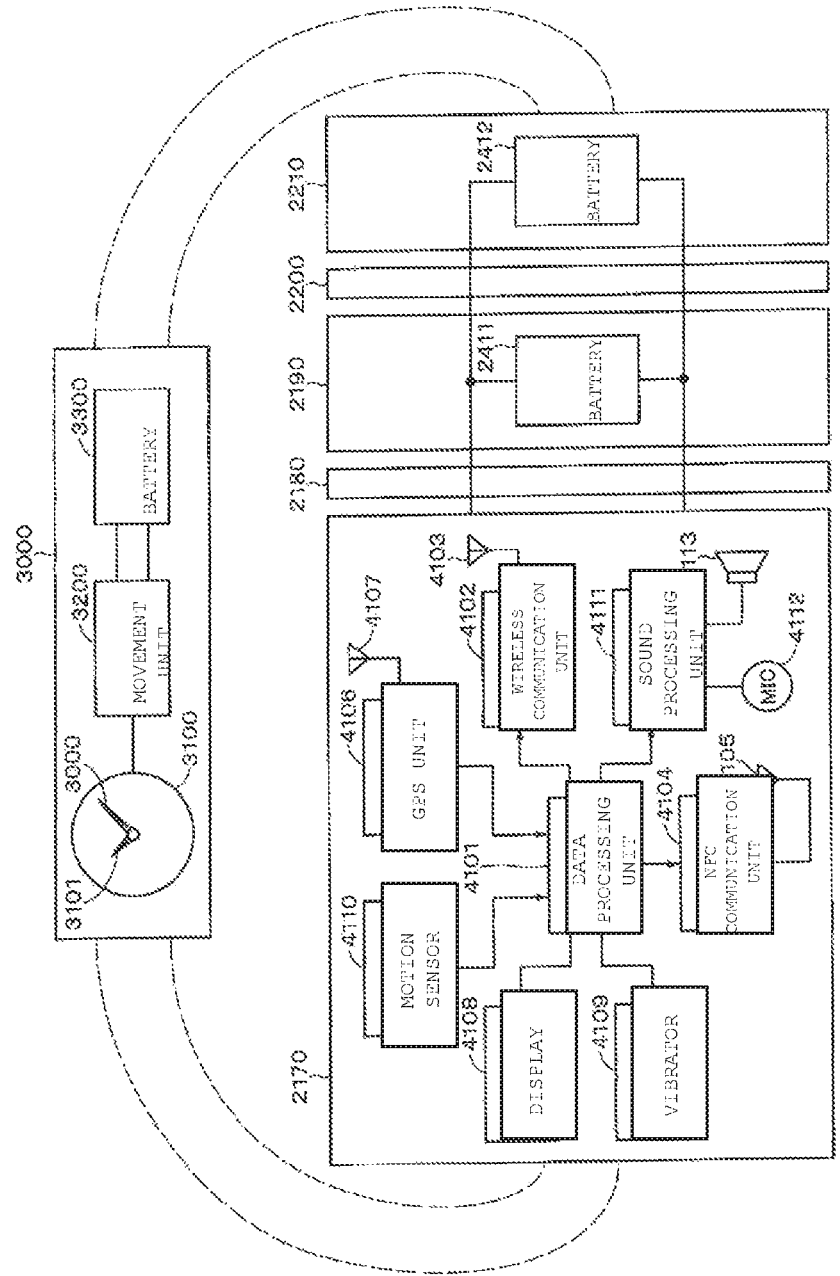
FIG. 26 is a block diagram illustrating the circuit configuration of Application Example (band-type electronic device) of a secondary battery according to an embodiment of the present technology.

FIG. 26 is a block diagram illustrating the circuit configuration of the band-type electronic device 2000. The circuitry inside the band-type electronic device 2000 is configured independently of the watch main body 3000. The watch main body 3000 includes a movement unit 3200 that rotates hands disposed on the dial face 3100. A battery 3300 is connected to the movement unit 3200. The movement unit 3200 and the battery 3300 are built in the housing of the watch main body 3000.

In the band-type electronic device 2000 connected to the watch main body 3000, electronic components are disposed in the three segments 2170, 2190, and 2210. In the segment 2170, a data processing unit 4101, a wireless communication unit 4102, an NEC communication unit 4104, and a GPS unit 4106 are disposed. Antennas 4103, 4105, and 4107 are connected respectively to the wireless communication unit 4102, the NFC communication unit 4104, and the GPS unit 4106. The respective antennas 4103, 4105, and 4107 are disposed in the vicinity of a slit 2173 of the segment 2170, which will be described later.

The wireless communication unit 4102 performs Near Field Communication with another terminal in accordance with the standard of Bluetooth (registered trademark), for example. The NFC communication unit 4104 performs wireless communication with a close reader; writer in accordance with the standard of NFC. The GPS unit 4106 is a positioning unit that performs positioning of the actual position in response to receipt of a radio wave from a satellite of a system referred to as a GPS (Global Positioning System). The data obtained in the foregoing wireless communication unit 4102, NFC communication unit 4104, and GPS unit 4106 is supplied to the data processing unit 4101.

In addition, in the segment 2170, a display 4108, a vibrator 4109, a motion sensor 4110, and a sound processing unit 4111 are disposed. The display 4108 and the vibrator 4109 function as a notification unit for notifying the wearer of the band-type electronic device 2000. The display 4108 composed of a plurality of light emitting diodes notifies the user by turning on or blinking the light emitting diodes. The plurality of light emitting diodes is disposed inside the slit 2173, as will be described later, of the segment 2170, for example, and turned on or blinked for notification of incoming calls, e-mail reception, and the like. As the display 4108, a type that displays words, figures, and the like may be used. The vibrator 4109 is a member that vibrates the segment 2170. The band-type electronic device 2000 achieves notification of incoming calls, e-mail reception, and the like via the vibration of the segment 2170 by the vibrator 4109.

The motion sensor 4110 detects the movement of the user with the band-type electronic device 2000 worn. As the motion sensor 4110, an acceleration sensor, a gyroscope sensor, an electronic compass, an atmospheric pressure sensor, or the like is used. In addition, the segment 2170 may have built-in sensors other than the motion sensor 4110. For example, a biosensor may be built in which detects the pulse or the like of the user with the band-type electronic device 2000 worn. A microphone 4112 and a speaker 4113 are connected to the sound processing unit 4111, and the sound processing unit 4111 performs processing of a call with a party connected via wireless communication in the wireless communication unit 4102. In addition, the sound processing unit 4111 can also perform processing for sound input operation.

Further, the battery 2411 is built in the segment 2190, and the battery 2421 is built in the segment 2210. The batteries 2411 and 2421 can be composed of the secondary battery according to the present technology, which supplies power supply for driving to the circuitry in the segment 2170. The circuitry in the segment 2170 and the batteries 2411 and 2421 are connected by the flexible circuit board 2400 (FIG. 25). It is to be noted that although not shown in FIG. 26, the segment 2170 has terminals for charging the batteries 2411 and 2421. In addition, electronic component other than the batteries 2411 and 2421 may be disposed in the segments 2190 and 2210. For example, the segments 2190 and 2210 may be adapted to include a circuit that controls charging and discharging of the batteries 2411 and 2421.

The eyewear-type terminal described below is intended to allow information such as texts, symbols, and images to be superimposed and displayed on the landscape in front of the eyes. More specifically, the terminal is equipped with a lightweight and thin image display device display module dedicated to the transmissive eyewear-type terminal. Typical examples of the terminal include a head-mounted display (head-mounted display (HMD)).

This image display device is composed of an optical engine and a hologram light guide plate. The optical engine emits image light such as images and texts with the use of a microdisplay lens. This image light enters the hologram light guide plate. The hologram light guide plate has a transparent plate with hologram optical elements incorporated at both ends of the transparent plate, and the image light from the optical engine is propagated through the transparent plate which is very thin such as 1 mm in thickness, and then delivered to the eyes of an observer. Such a configuration achieves a lens of 3 mm in thickness (including a protective plate around the light guide plate), which has a transmittance of 85%, for example. The eyewear-type terminal of interest makes it possible to see the results of players and teams in real time in the middle of watching sports, and display tour guides at travel destinations.

Figure 27:
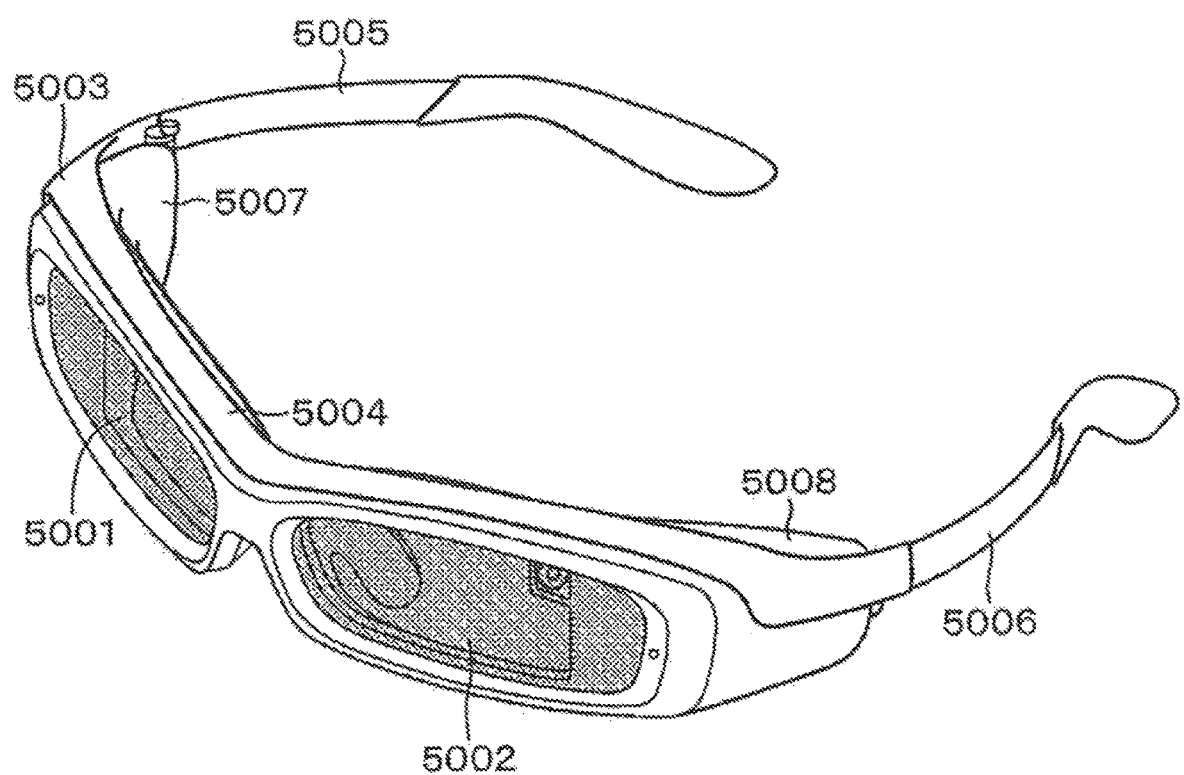
FIG. 27 is a diagram illustrating a specific example of the configuration of Application Example (eyewear-type terminal) of a secondary battery according to an embodiment the present technology.

In a specific example of the eyewear-type terminal, as shown in FIG. 27, an image display unit has an eyewear-type configuration. More specifically, as with normal eyeglasses, the terminal has a frame 5003 for holding a right image display unit 5001 and a left image display unit 5002 in front of the eyes. The frame 5003 is composed of a front part 5004 disposed in front of the observer and two temple parts 5005 and 5006 pivotally attached to both ends of the front part 5004 with hinges interposed therebetween. The frame 5003 is made of the same material as a material constituting normal glasses, such as a metal, an alloy, a plastic, and a combination thereof. It is to be noted that a headphone part may be provided.

The right image display unit 5001 and the left image display unit 5002 are arranged so as to be located respectively in front of the right eye and left eye of the user. The temple parts 5005 and 5006 hold the image display units 5001 and 5002 on the user's head. At the connection between the front part 5004 and the temple part 5005, a right display driving unit 5007 is disposed inside the temple part 5005. At the connection between the front part 5004 and the temple part 5006, a left display driving unit 5008 is disposed inside the temple part 5006.

Although omitted in FIG. 27, the frame 5003 is equipped with a secondary battery according to the present technology, an acceleration sensor, a gyro, an electronic compass, a microphone/speaker, and the like. Furthermore, an imaging device is attached, thereby allowing still images/moving images to be shot. Furthermore, the frame includes a controller connected to the eyewear part via, for example, a wireless or wired interface. The controller is provided with a touch sensor, various buttons, a speaker, a microphone, and the like. Furthermore, the frame has the function of cooperating with smartphones. For example, the GPS function of a smartphone is utilized, thereby making it possible to provide information depending on the user's situation.

The present technology is not to be considered limited to each of the respective embodiments, examples, and application examples mentioned above, and can be modified without departing from the scope of the present technology.

It should be understood that the advantageous effect of the present technology should be achieved, independently of the type of the electrode reactant, as long as the reactant is an electrode reactant for use in secondary batteries, and thus, a similar effect can be achieved even if the type of the electrode reactant is changed. In addition, the chemical formulas of compounds and the like are considered representative, and not limited to the listed valences or the like, as long as the formulas refer to generic terms for the same compounds.

The present technology is described below in further detail according to an embodiment.

[1]

A secondary battery including an electrode, an electrolytic solution, a can containing the electrode and the electrolytic solution, and an insulator disposed between the electrode and the can;
  where the can bottom of the can has at least one recess,
  the insulator has at least one hole, and
  at least a part of the at least one recess and at least a part of the at least one hole have no overlap with each other.

[2]

The secondary battery according to [1], where the at least one recess and the at least one hole have no overlap with each other.

[3]

The secondary battery according to [1] or [2], where the overlap ratio between the at least one recess and the at least one hole is 13% or less.

The secondary battery according to any one of [1] to [3], where the opening ratio of the at least one hole is 5% or more and 40% or less.

[5]

The secondary battery according to any one of [1] to [4], where the battery capacity is 2.5 Ah or more.

[6]

The secondary battery according to any one of [1] to [5], where the insulator includes an insulating plate and a filter member.

[7]
The secondary battery according to [6], where the filter member is a non-woven fabric.
[8]
The secondary battery according to any one of [1] to [5], where the insulator includes an insulating plate.
[9]
The secondary battery according to any one of [1] to [8], where the secondary battery is cylindrical.
[10]
A battery pack including:
the secondary battery according to any one of [1] to [9];
a control unit that controls the usage state of the secondary battery; and
a switch unit that switches the usage state of the secondary battery in accordance with an instruction from the control unit.
[11]
A vehicle including:
the secondary battery according to any one of [1] to [9];
a driving force conversion device that receives power supply from the secondary battery to convert the power to a driving force for the vehicle;
a driving unit that works in accordance with the driving force; and
a vehicle control device.
[12]
An electric storage system including:
an electric storage device including the secondary battery according to any one of [1] to [9];
a power consumption device that is supplied with electric power from the secondary battery;
a control device that controls power supply to the power consumption device from the secondary battery; and
a power generation device that charges the secondary battery.
[13]
A power tool including:
the secondary battery according to any one of [1] to [9]; and
a movable part that is supplied with electric power from the secondary battery.
[14]
An electronic device including:
the secondary battery according to any one of [1] to [9],
where the device receives power supply from the secondary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising an electrode, an electrolytic solution, a can configured to accommodate the electrode and the electrolytic solution, and an insulator disposed between the electrode and a can bottom of the can; wherein an inner surface of the can bottom of the can has at least one recess, wherein the insulator has at least one hole, wherein the at least one recess and the at least one hole have no overlap with each other, wherein the at least one recess has a thin-walled part, wherein the at least one recess has a recess thickness and the can bottom has a can bottom thickness, and wherein the recess thickness is less than the can bottom thickness,
wherein the insulator includes a plurality of insulator holes, an insulating plate and a filter member, wherein the plurality of insulator holes include a first insulator hole, wherein the first insulator hole includes a second bore that does not overlap the at least one recess, and wherein a pitch of the plurality of insulator holes is larger than a width of the at least one recess.

2. The secondary battery according to claim 1, wherein an overlap ratio between the at least one recess and the at least one hole is 13% or less.

3. The secondary battery according to claim 1, wherein an opening ratio of the at least one hole is 5% or more and 40% or less.

4. The secondary battery according to claim 1, wherein a battery capacity of the secondary battery is 2.5 Ah or more.

5. The secondary battery according to claim 1, wherein the filter member includes a non-woven fabric.

6. The secondary battery according to claim 1, wherein the secondary battery has a cylindrical shape.

7. A battery pack comprising:
the secondary battery according to claim 1;
a controller configured to control a usage state of the secondary battery; and
a switch configured to switch the usage state of the secondary battery in accordance with an instruction from the controller.

8. A vehicle comprising:
the secondary battery according to claim 1;
a driving force converter configured to receive power supply from the secondary battery to convert the power to a driving force for the vehicle;
a driver configured to work in accordance with the driving force; and
a vehicle controller.

9. An electric storage system comprising:
an electric storage device including the secondary battery according to claim 1;
a power consumption device configured to be supplied with electric power from the secondary battery;
a controller configured to control power supply to the power consumption device from the secondary battery; and
a power generator configured to charge the secondary battery.

10. A power tool comprising:
the secondary battery according to claim 1; and
a movable part configured to be supplied with electric power from the secondary battery.

11. An electronic device comprising the secondary battery according to claim 1,
wherein the electronic device is configured to receive power supply from the secondary battery.

12. The secondary battery according to claim 1, wherein the insulating plate has a central insulating plate hole and at least one peripheral insulating plate hole, and wherein the at least one recess does not overlap the at least one peripheral insulating plate hole.

13. The secondary battery according to claim 1, wherein the first insulator hole is partially opposed to the at least one recess.

* * * * *